(12) United States Patent
Wildsmith

(10) Patent No.: US 12,197,572 B2
(45) Date of Patent: *Jan. 14, 2025

(54) SYSTEMS AND METHODS FOR PREPARING CODE FOR MALICIOUS BEHAVIOR ANALYSIS

(71) Applicant: Fortinet, Inc., Sunnyvale, CA (US)

(72) Inventor: Jeremy Allen Wildsmith, Surrey (CA)

(73) Assignee: Fortinet, Inc., Sunnyvale, CA (US)

( * ) Notice: Subject to any disclaimer, the term of this patent is extended or adjusted under 35 U.S.C. 154(b) by 466 days.

This patent is subject to a terminal disclaimer.

(21) Appl. No.: 17/570,223

(22) Filed: Jan. 6, 2022

(65) Prior Publication Data
US 2023/0137942 A1 May 4, 2023

Related U.S. Application Data

(62) Division of application No. 17/516,307, filed on Nov. 1, 2021, now Pat. No. 11,841,948.

(51) Int. Cl.
*G06F 21/56* (2013.01)
*G06F 21/14* (2013.01)

(52) U.S. Cl.
CPC ............ *G06F 21/563* (2013.01); *G06F 21/14* (2013.01); *G06F 21/566* (2013.01); *G06F 2221/033* (2013.01)

(58) Field of Classification Search
CPC . G06F 21/563; G06F 8/34; G06F 8/53; G06F 8/75; G06F 2221/033
See application file for complete search history.

(56) References Cited

U.S. PATENT DOCUMENTS

| 8,776,026 B2 * | 7/2014 | Candea ............... G06F 9/45516 717/126 |
| 2017/0004308 A1 * | 1/2017 | Gupta .................... G06F 21/562 |
| 2020/0089873 A1 * | 3/2020 | Yi .......................... G06F 21/566 |

OTHER PUBLICATIONS

Francis Gabriel, "Deobfuscation: Recovering an OLLVM-Protected Program", pub. Dec. 4, 2014, pp. 1-25. (Recovered from the Internet at https://blog.quarkslab.com/deobfuscation-recovering-an-ollvm-protected-program.html). (Year: 2014).*

Dullien "REIL: A Platform-Independent Intermediate Representation of Disassembled Code for Static Code Analysis" Research Gate 2009 Ret Jan. 2021 URL: <https://www.researchgate.ne.

Hasabnis "Lifting Assembly to Intermediate Represenation: A Novel Approach Leveraging Compilers" ret Jan. 2021 URL:https://dl.acm.org/doi/10.1145/2872362.2872380.

Korencik "Decompiling Binaries Into LLVM IR Using McSema and Dynist" Red Hat Research ret Jan. 2021 URL:https://research.redhat.com/blog/theses/.

* cited by examiner

*Primary Examiner* — Paul E Callahan

(74) *Attorney, Agent, or Firm* — Jaffery Watson Hamilton & DeSanctis LLP

(57) ABSTRACT

Systems, devices, and methods are discussed that provide for discovering protected data from a code. Such detection provides an ability to discover potentially malicious code and/or datasets obfuscated within a code prior to full execution of the code.

15 Claims, 16 Drawing Sheets

| | |
|---|---|
| Start { | x=input() |
| | While True do |
| Operation A { | If x>10 or stop then |
| Operation B { | break |
| Operation C { | print(x) |
| | if x=3: |
| Operation D { | stop =True |
| | else |
| Operation E { | x=x*x+9 |

SYSTEMS AND METHODS FOR PREPARING CODE FOR MALICIOUS BEHAVIOR ANALYSIS

CROSS REFERENCE TO RELATED APPLICATIONS

The present application is a divisional of U.S. patent application Ser. No. 17/516,307 entitled "Systems and Methods for Unpacking Protected Data From Obfuscated Code', and filed Nov. 1, 2021 by Wildsmith, now U.S. Pat. No. 11,841,948 issued Dec. 12, 2023. The entirety of the aforementioned application is incorporated herein by reference for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet, Inc.

FIELD

Embodiments discussed generally relate to identifying malicious code and/or datasets, and more particularly to systems, devices, and methods that provide for discovering protected data obfuscated within a code.

BACKGROUND

Malicious codes and/or datasets can be incorporated within an executable code. When the executable code is executed, the malicious code and/or dataset is opened by the executing code. Once opened, the malicious code and/or dataset are enabled to make the malicious changes for which it was designed. To avoid such a situation, executable code may be analyzed to detect any malicious components within the executable code. Where such malicious components are discovered, the executable code may be quarantined. To avoid discovery and quarantine, developers of malicious code and/or datasets often encode the malicious code and/or dataset to avoid detection. Only after the executable code is operating is the malicious code and/or dataset de-encrypted. This de-encryption avoids many static analysis available for detecting malicious code and/or dataset increasing the likelihood of an attack by the malicious code and/or dataset.

Thus, there exists a need in the art for more advanced approaches, devices, and systems for detecting malicious code and/or datasets obfuscated by an executable code.

SUMMARY

Various embodiments provide systems, devices, and methods that provide for discovering protected data obfuscated within a code.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1:
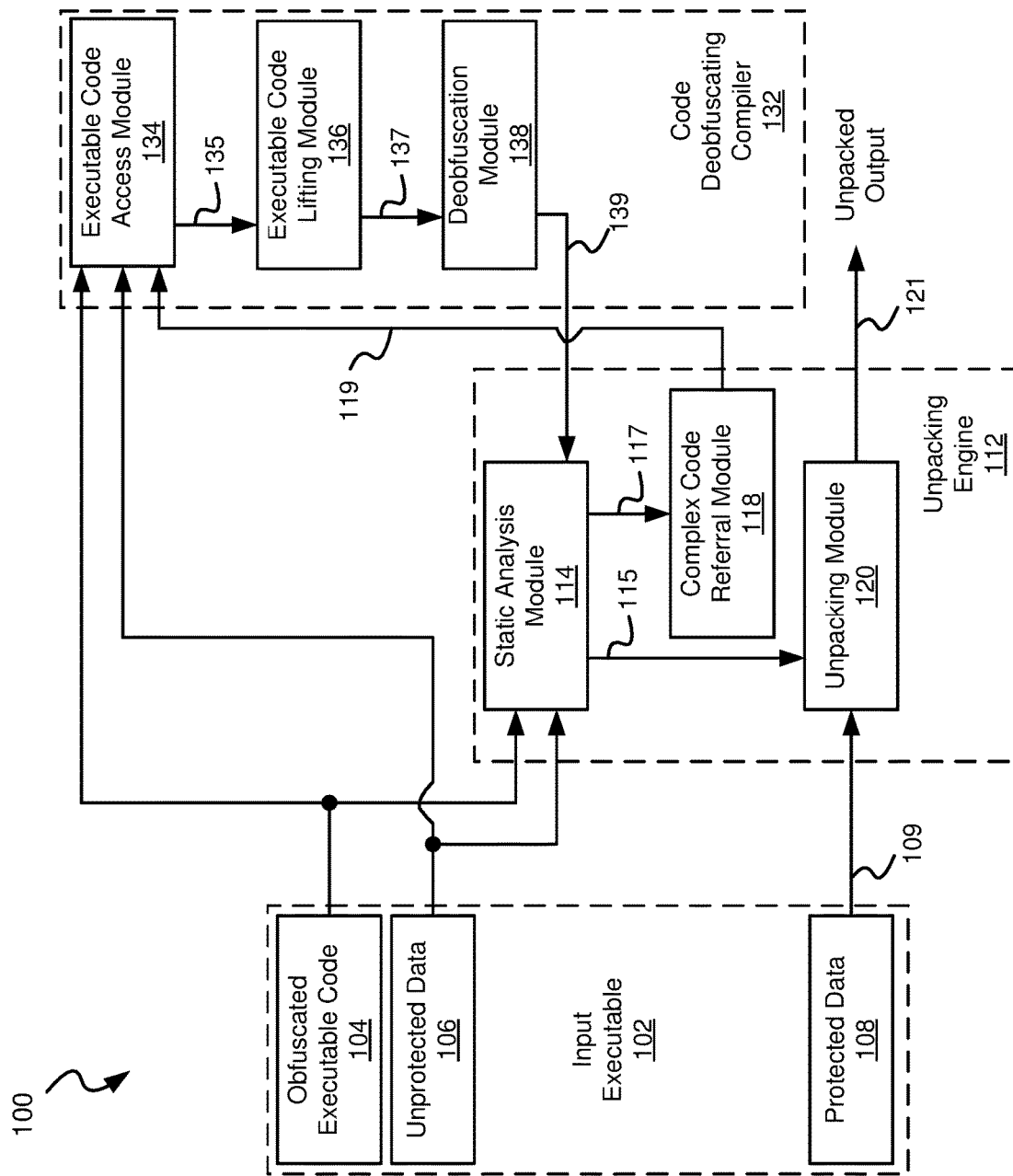
FIG. 1 is a block diagram of a code analysis system including an unpacking engine and a code deobfuscation compiler in accordance with some embodiments.

Various embodiments provide systems, devices, and methods that provide for discovering protected data obfuscated within a code.

Unpacking code to detect potential malicious behavior may rely upon static executable code analysis. As used herein, the phrases "static executable code analysis", "static code analysis", or "static analysis" refer broadly to any technique or process where a sample is analyzed to understand the way the protected resources are embedded and encrypted/compressed/encoded, and then proceed to implement an algorithm which can take (as input) the protected application and decryption keys or other data necessary for recovering the embedded resource (i.e., unpacking variables) and produce as output the recovered embedded resources. In contrast, as used herein, the phrases "dynamic executable code analysis", "dynamic code analysis", or "dynamic analysis" refer broadly to any technique or process where an executable code is executed and its operations analyzed as it executes. Such execution may be done in a constructed environment (i.e. a sandbox or an isolated physical machine) so that it extracts its embedded resources at runtime in such a way as to allow for capture thereof. For example, dynamically unpacking a UPX sample would be to have it execute inside of a sandbox or emulator and capture the dumped code while it executes. As will be appreciated by one of ordinary skill in the art, a fundamental difference between static code analysis and dynamic code analysis is that, in static code analysis, a portion of the executable code is generally not executed or if so only in small isolated bits with heavy instrumentation logic. This differs from dynamic unpacking where typically execution is performed in extremely broad strokes (e.g., simply executing the entire executable code from entry point and monitoring it during runtime).

Dynamic analysis necessarily exposes any protected code or datasets, but has a number of limitations. For example, dynamic analysis does not provide deobfuscated code which can be valuable to a variety of analysis beyond identifying malicious code and/or datasets. As another example, dynamic analysis can be difficult to scale; without a lightweight solution like an emulator/interpreter which in many cases is not available, a virtual machine or sandbox solution combined with a real-time behavioral monitoring solutions such as Hollows Hunter™ or PE-Sieve™ is required. This can result in a substantial overhead and performance cost. As yet another example, dynamic analysis coverage is limited to the realized behavior of a sample as it executes in the provided environment. If a sample does not execute the appropriate paths to trigger access to protected portions (e.g., the executable code incorporates Anti-VM detection or only targets specific environments that are not consistent with a provided sandbox/emulator/interpreter) a dynamic approach will fail to access the protected portions of the code.

Embodiments discussed herein use static executable code analysis may perform a code unpacking algorithm that analyzes the executable code to identify one or more unpacking variables that may be used to gain access to otherwise protected portions of the executable code. As used herein, the phrase "code protector" is used in its broadest sense to mean any tool or component there of which protects a sample. As an example, an executable code directly produced by a compiler is "unprotected" or not obfuscated and the data (e.g., strings, etc. . . . ) is not encrypted. This unprotected executable may be passed to a code protector (e.g., .Net Reactor™, SmartAssembly™, ConfuserEx™, O-LLVM in a compilation pipeline or the like) that obfuscates the combination of code and data to produce a protected executable. The unique challenges introduced by code protectors is that they are designed in such a way as to introduce many unpacking variables as well as introducing various obstacles in recovering these variables. Many of these variables are embedded in synthesized/obfuscated code which are difficult to recover statically due to the obfuscations applied and limited ability of the unpacking algorithm to fully access the executable code without additional capability. Based upon the disclosure provided herein, one of ordinary skill in the art will recognize a variety of code protectors and/or combinations of code protectors that may be identified by an unpacking algorithm in accordance with different embodiments. Further, based upon the disclosure provided herein, one of ordinary skill in the art will recognize approaches for identifying particular code protectors and/or for unpacking code from a given code protector. The following table provides two example code protectors, static analysis revealing the necessary unpacking variables, and code unpacking used in relation to the unpacking variables.

| Detected Code Protector (Protection Tool) | Static Analysis Module | Unpacking module |
|---|---|---|
| ConfuserEx ™ | Look for Unpacking Variables: (A) An Array initialized with protected data (B) Values of IV and Key (C) Code responsible for coalescing Key with Public Key Token (D) Public Key Token | 1. Interpret (C), providing (B) and (D) to get computed Key and IV 2. Apply computed Key and IV with (A) to get unprotected data |
| SmartAssembly ™ | Look for Unpacking Variables: (A) Look for Assembly Resolve Handlers (B) For each AssemblyResolve Handler identify related Embedded Resources (C) For each AssemblyResolve Handler identify Decryption Keys | 1. For each Embedded Resource associated to an AssemblyResolve Handler we have (A, B, C): 2. Apply DES Decryption key (C) to embedded resource (B) 3. Check if buffer is compressed (Zip Stream) and decompress, otherwise dump. |

In some embodiments, an additional code deobfuscation compiler is used to further expose the structure of the executable code making it possible for unpacking algorithm to identify additional unpacking variables and therewith to access otherwise protected portions of the code. Once the protected portions are accessed, the unpacking algorithm lifts the obfuscated code to an intermediate form (DNIR) and then applies deobfuscation on the DNIR. The deobfuscated DNIR is then associated with the original obfuscated code. Unprotected data from deobfuscating the DNIR is saved as a separate data set. As such, the received executable code remains intact while protected data from the executable code is saved separately. This resulting unpacked executable code (i.e., the combination of the executable code and the now unprotected data may be, for example, subject to various downstream analysis where the executable code is reviewed for malicious code and/or datasets.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Various embodiments provide methods for flattening a control flow of an executable code. Such methods include: identifying, by a processing resource, a portion of the executable code protected by an unpacking variable; applying, by the processing resource, a code deobfuscation process to the identified portion of the executable code to yield the unpacking variable; and using, by the processing resource, the unpacking variable to unpack the portion of the executable code to yield a corresponding unpacked data set. In some instances of the aforementioned embodiments, identifying the portion of the executable code protected by the unpacking variable is done using static code analysis.

In various instances of the aforementioned embodiments where the unpacking variable is a first unpacking variable and the unpacked data set is a first unpacked data set, the methods further include generating, by the processing resource, a graphical intermediate representation of the portion of the executable code; identifying, by the processing resource, a portion of the graphical intermediate representation of the portion of the executable code possibly protected by a second unpacking variable; applying, by the processing resource, the code deobfuscation process to the portion of the graphical intermediate representation of the portion of the executable code to yield the second unpacking variable; and using, by the processing resource, the second unpacking variable to unpack a portion of the executable code corresponding to the portion of the graphical intermediate representation of the portion of the executable code to yield a corresponding second unpacked data set. In some instances of the aforementioned embodiments, the methods further include performing, by the processing resource, malicious code detection on the unpacked data set.

In some instances of the aforementioned embodiments, the code deobfuscation process includes lifting, by the processing resource, the executable code protected by the unpacking variable to a graphical intermediate representation. In some such instances, the code deobfuscation process further includes: identifying, by the processing resource, a dispatcher node in the graphical intermediate representation; identifying, by the processing resource, at least one work item, wherein the at least one work item is a path through the dispatcher node and includes at least one operation node in addition to the dispatcher node; proving, by the processing resource, a branch behavior of the dispatcher node, wherein proving the branch behavior includes applying at least one algorithm to the work item to yield at least one solution path, wherein the at least one solution path is included in a solution set; and modifying, by the processing resource, the graphical intermediate representation of the executable code to yield a modified graphical intermediate representation, and wherein the dispatcher node is eliminated from the modified graphical intermediate representation.

Other embodiments provide systems for flattening a control flow of an executable code. The systems include a processing resource and a non-transitory computer-readable medium coupled to the processing resource. The non-transitory computer-readable medium has stored therein instructions that when executed by the processing resource cause the processing resource to: identify a portion of the executable code protected by an unpacking variable; apply a code deobfuscation process to the identified portion of the executable code to yield the unpacking variable; and use the unpacking variable to unpack the portion of the executable code to yield a corresponding unpacked data set.

Yet other embodiments provide non-transitory computer-readable storage media having stored therein instructions that when executed by the processing resource cause the processing resource to: identify a portion of the executable code protected by an unpacking variable; apply a code deobfuscation process to the identified portion of the executable code to yield the unpacking variable; and use the unpacking variable to unpack the portion of the executable code to yield a corresponding unpacked data set.

Yet further embodiments provide methods for preparing code for malicious behavior analysis. Such method include: generating, by a processing resource, a graphical intermediate representation of an executable code; and applying, by the processing resource, a code deobfuscation process to the graphical intermediate representation to yield a modified graphical intermediate representation. The modified graphical intermediate representation eliminates the dispatcher node.

Additional embodiments provide systems for preparing code for malicious behavior analysis. The systems include a processing resource and a non-transitory computer-readable medium coupled to the processing resource. The non-transitory computer-readable medium has stored therein instructions that when executed by the processing resource cause the processing resource to: generate a graphical intermediate representation of an executable code; and apply a code deobfuscation process to the graphical intermediate representation to yield a modified graphical intermediate representation. The modified graphical intermediate representation eliminates a dispatcher node.

Further embodiments provide non-transitory computer-readable storage media embodying a set of instructions, which when executed by a processing resource of a computer system, causes the one or more processing resources to: generate a graphical intermediate representation of an executable code; and apply a code deobfuscation process to the graphical intermediate representation to yield a modified graphical intermediate representation. The modified graphical intermediate representation eliminates a dispatcher node.

Yet additional embodiments provide methods for code deobfuscation that include: identifying a dispatcher node in a graphical intermediate representation of an executable code; identifying at least one work item that is a path through the dispatcher node and includes at least one operation node in addition to the dispatcher node; proving the branch behavior of the dispatcher node by applying at least one algorithm to the work item to yield at least one solution path where the at least one solution path is included in a solution set; and modifying the graphical intermediate representation of the executable code to yield a modified graphical intermediate representation. The dispatcher node is eliminated from the modified graphical intermediate representation.

In some instances of the aforementioned embodiments, the modified graphical intermediate representation is in SSA format. In various instances of the aforementioned embodiments, the path through the dispatcher node must meet the following criteria: (i) the path ends at the dispatcher node; and (ii) the path includes only one instance of any given operation node.

In one or more instances of the aforementioned embodiments, modifying the graphical intermediate representation of the executable code to yield the modified graphical intermediate representation includes reducing the solution set to yield a solution reduction tree. In some such instances, modifying the graphical intermediate representation of the executable code to yield the modified graphical intermediate representation further includes extracting paths from the solution reduction tree to yield a solution. In some cases, modifying the graphical intermediate representation of the executable code to yield the modified graphical intermediate representation further includes actualizing the solution to yield an actualized solution corresponding to the branch of the graphical intermediate representation. In such cases, the modified graphical intermediate representation includes the actualized solution.

In various instances of the aforementioned embodiments where the at least one operation node is a first operation node, the path through the dispatcher node is a first path through the dispatcher node, and the at least one algorithm is a direct algorithm, proving the branch behavior of the dispatcher node further includes: determining that application of the direct algorithm to the work item fails to yield any solution path; identifying a second path through the dispatcher node that includes a second operation node in addition to the first operation node; and applying the direct algorithm to the second path through the dispatcher node to yield the at least one solution path. In some such instances, the second path through the dispatcher node must meet the following criteria: (i) the second path ends at the dispatcher node; and (ii) the second path includes only one instance of any given operation node. In various instances, the second path through the dispatcher node meets the following criteria: where there is a single predecessor operation node to the first node of the first path, the single predecessor operation node is prepended to the first operation node to form the second path.

In some instances of the aforementioned embodiments where the at least one algorithm includes a direct algorithm, proving the branch behavior of the dispatcher node further includes: determining that application of the direct algorithm to the work item failed to yield the solution path; and applying a symbolic algorithm to the identified control flow problem to yield the solution set.

Other embodiments provide systems for code deobfuscation that include: a processing resource and a non-transitory computer-readable medium coupled to the processing resource. The non-transitory computer-readable medium has stored therein instructions that when executed by the processing resource cause the processing resource to: identify a dispatcher node in a graphical intermediate representation of an executable code; identify at least one work item, wherein the at least one work item is a path through the dispatcher node and includes at least one operation node in addition to the dispatcher node; prove a branch behavior of the dispatcher node, where proving the branch behavior includes applying at least one algorithm to the work item to yield at least one solution path, where the at least one solution path is included in a solution set; and modify the graphical intermediate representation of the executable code to yield a modified graphical intermediate representation. The dispatcher node is eliminated from the modified graphical intermediate representation.

Yet other embodiments provide non-transitory computer-readable storage media embodying a set of instructions, which when executed by a processing resource of a computer system, causes the one or more processing resources to: identify a dispatcher node in a graphical intermediate representation of an executable code; identify at least one work item, wherein the at least one work item is a path through the dispatcher node and includes at least one operation node in addition to the dispatcher node; prove a branch behavior of the dispatcher node, where proving the branch behavior includes applying at least one algorithm to the work item to yield at least one solution path, where the at least one solution path is included in a solution set; modify the graphical intermediate representation of the executable code to yield a modified graphical intermediate representation. The dispatcher node is eliminated from the modified graphical intermediate representation.

Turning to FIG. 1, a block diagram of a code analysis system 100 is shown including an unpacking engine 112 and a code deobfuscation compiler 132 in accordance with some embodiments. In general, code deobfuscation compiler 132 implements logic related to compiling obfuscated executable code 104 from the source format into an intermediate format code that can be more easily statically analyzed. Code deobfuscation compiler 132 then deobfuscates the intermediate format code such that it can be analyzed by unpacking engine 112. Unpacking engine 112 is configured for instrumenting code deobfuscating compiler 132 such that it allows access to the necessary unpacking variables. Collecting these unpacking variables via static analysis and then applying the deobfuscation algorithm using the unpacking variables.

Code analysis system 100 operates on an input executable 102. Input executable 102 may be any executable code designed for execution by a processor. In some cases, input executable 102 may include obfuscated executable code 104, unprotected data 106, and/or protected data 108. Such protected data 108 may be any type of data or code that is guarded by one or more unpacking variables that may have been previously applied by a code protector. Such unprotected data 106 may be any type of data or code that is accessible without using an unpacking variable. Obfuscated executable code 104 is any type of executable code that includes at least one branch operation.

Unpacking engine 112 includes a static analysis module 114, a complex code referral module 118, and an unpacking module 120. It is noted that the embodiment shown assumes that a code protector that was used to protect input executable 102 may have been identified and that static analysis module 114 and unpacking module 120 are selected for use depending on this identification or absence thereof. There may be a number of different combinations of static analysis modules and unpacking modules each taking a different approach to identifying unpacking variables. Identification of the particular code protector that was used to protect input executable 102 may be done using any process or technology known in the art. Based upon the disclosure provided herein, one of ordinary skill in the art will recognize a variety of approaches and technologies for identifying a code protector. For the purposes of this application, it is understood that the code protector may have been identified and that static analysis module 114 and unpacking module 120 correspond to this identification or absence thereof. In general, static analysis module 114 is configured to identify unpacking variables, and unpacking module 120 applies the identified unpacking variables to recover protected data (i.e., make the data unprotected and therefore applicable to static analysis). Unpacking generally refers to the process of transforming data from a compressed/encrypted/encoded form that is guarded by unpacking variable(s) to a form that is accessible without using any unpacking variables. Along with input executable 102, one or more unpacking variables that were identified outside of code analysis system 100 are indicated to code analysis system. A static analysis module 114 and a unpacking module 120 specific to the identification (or absence thereof) of a code protector is selected.

Static analysis module 114 may implement any static analysis algorithm known in the art that identifies unpacking variables within obfuscated executable code 104 and/or unprotected data 106; and identifies unpacking variables within deobfuscated code 139 and/or unprotected data. In operation, static analysis module 114 initially applies its static analysis engine to obfuscated executable code 104 and unprotected data 106 to identify one or more unpacking variables for protected data 108. As each unpacking variable is identified, static analysis module 114 applies the unpacking variable to protected data 108 and determines whether any portions of protected data 108 remain protected. This process continues until all unpacking variables identified by static analysis module 114 have been used.

Where no portions of protected data 108 remain protected after application of the unpacking variables identified by static analysis module 114, all of the identified unpacking variables, obfuscated executable code 104, and unprotected data 106 are provided to unpacking module 120 as a packed code 115. In turn, unpacking module 120 applies the identified unpacking variables to protected data 108 to yield corresponding accessed data. Unpacking module 120 places this accessed data into the combination of obfuscated executable code 104 and unprotected data 106 in such a way that it replaces protected data 108. The result is provided by unpacking module 120 as an unpacked output 121.

Alternatively, where portions of protected data 108 remain protected after application of the unpacking variables identified by static analysis module 114, static analysis module 114 provides an identifier output 117 to complex code referral module 118. Identifier output 117 indicates portions of obfuscated executable code 104 that static analysis module was unable to fully analyze due to complexity. In turn, complex code referral module 118 provides an identifier output 119 to code deobfuscating compiler 132 that indicates portions of obfuscated executable code 104 for which deobfuscation is requested. As more fully described below, code deobfuscating compiler 132 applies a deobfuscation process to the identified portions of obfuscated executable code 104, and returns deobfuscated code 139.

Static analysis module 114 reapplies the aforementioned static analysis using deobfuscated code 139 in place of portions of obfuscated executable code 104 to which it corresponds. This process is repeated until all portions of protected data 108 is accessed and obfuscated executable code 104 is fully deobfuscated by unpacking module 120.

In general, code deobfuscating compiler 132 accesses low-level code (e.g., executable code) and lifts the low-level code into a behaviorally equivalent higher level intermediate form. Code deobfuscating compiler 132 then analyzes the higher-level intermediate form, and performs deobfuscation using various iterations of different deobfuscation mutators. At some point in the deobfuscation process, the higher level intermediate form is translated into a static single assignment (SSA) form before the SSA higher level intermediate form is made available to unpacking engine 112.

Code deobfuscating compiler 132 includes an executable code access module 134 that accesses portions of obfuscated executable code 104 and/or unprotected data 106 indicated by identifier output 119, and provides the accessed portions 135 to an executable code lifting module 136. Executable code lifting module 136 translates the executable code to an intermediate state that is more suitable for deobfuscation, and the resulting intermediate format code 137 is provided to a deobfuscation module 138. The intermediate format code may be any code format into which executable code may be translated, and which when executed provides a similar process and result as the original executable code (i.e., intermediate format code 137 is behaviorally equivalent to the portions of obfuscated executable code 104 and/or unprotected data 106 that it represents). As an example, the intermediate format code may be LLVM language as is known in the art. As another example, the intermediate code format may be Reverse Engineering Intermediate Language (REIL) code as is known in the art. Based upon the disclosure provided herein, one of ordinary skill in the art will recognize other intermediate code languages to which the executable code may be lifted in accordance with different embodiments.

Deobfuscation module 138 uses a graphical representation approach to identify one or more dispatchers within the intermediate format code 137. Loops extending from the dispatchers are then analyzed and re-written using the intermediate code language to eliminate the dispatcher. Such an approach effectively resolves run-time branch decisions to static processes. The graphical intermediate language having the dispatcher removed is then provided as deobfuscated code 139 to unpacking engine 112 as discussed above.

Figure 2:
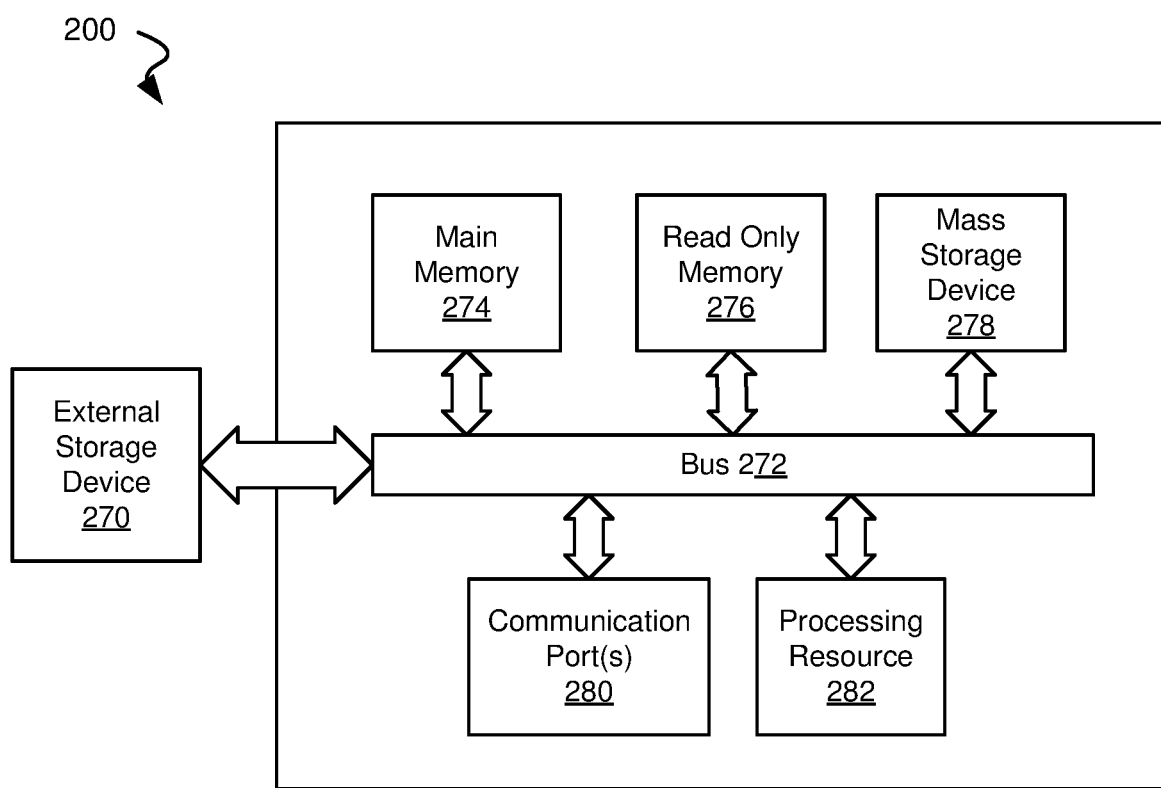
FIG. 2 is a block diagram of an example computer system that may be used to implement one or more embodiments discussed herein.

Turning to FIG. 2, an example computer system 200 is shown in which or with which embodiments of the present disclosure may be utilized. As shown in FIG. 2, computer system 200 includes an external storage device 270, a bus 272, a main memory 274, a read-only memory 276, a mass storage device 278, one or more communication ports 280, and one or more processing resources (e.g., processing circuitry 282). In one embodiment, computer system 200 may represent some portion of file access monitoring system 103, server 102, server 108, endpoint device 105a, endpoint device 105b, and/or endpoint device 105c.

Those skilled in the art will appreciate that computer system 200 may include more than one processing resource 282 and communication port 280. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 282 may include various modules associated with embodiments of the present disclosure.

Communication port 280 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 280 may be chosen depending on a network, such as a Local Area Network (LAN), Wide Area Network (WAN), or any network to which the computer system connects.

Memory 274 can be Random Access Memory (RAM), or any other dynamic storage device commonly known in the art. Read only memory 276 can be any static storage device(s) e.g., but not limited to, a Programmable Read Only Memory (PROM) chips for storing static information e.g., start-up or BIOS instructions for the processing resource.

Mass storage 278 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 272 communicatively couples processing resource(s) with the other memory, storage and communication blocks. Bus 272 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 272 to support direct operator interaction with the computer system. Other operator and administrative interfaces can be provided through network connections connected through communication port 280. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

Figure 3:
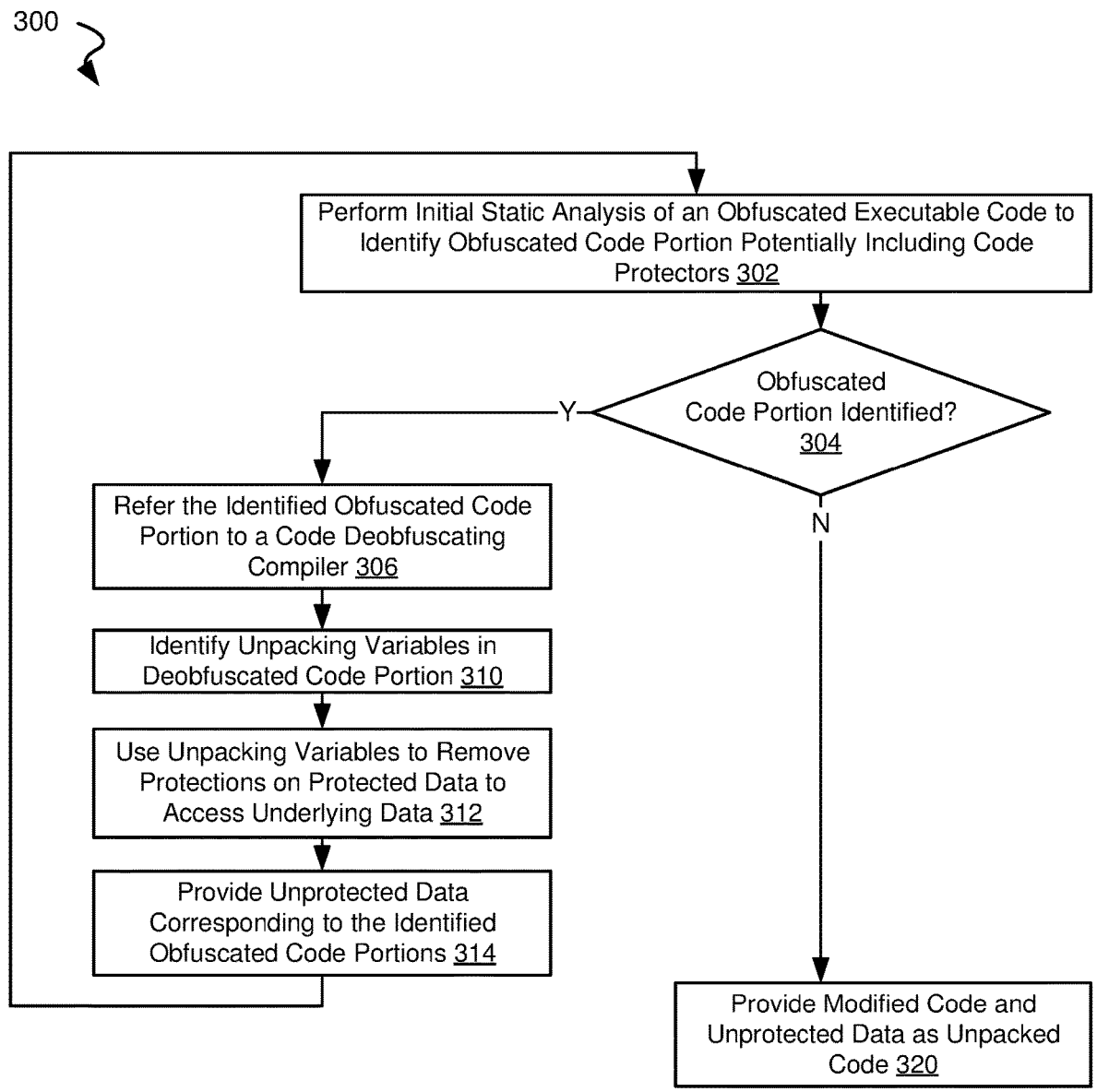
FIG. 3 is a flow diagram showing a method for code unpacking in accordance with various embodiments.

Turning to FIG. 3, a flow diagram 300 shows a method in accordance with various embodiments for code unpacking. The method discussed herein may be implemented, for example, by unpacking engine 112 introduced above. Following flow diagram 300, an initial high level analysis of an obfuscated executable code is performed (block 302). This initial high-level analysis is configured to identify any resource related sub-routines within the executable code that access any protected data. Such sub-routines may be, for example, sub-routines that load assemblies (i.e., registered as assembly resolve event handlers), a sub-routines that are invoked at the entry point of the obfuscated executable code.

In addition, one or more of the identified sub-routines are heuristically selected as likely to reveal one or more unpacking variables. Such heuristic selection may, for example, look for portions of the executable code common to a class or family of decryption, decompression, or other data protection removal processes. If the portion of the executable code is found to contain matching patterns or processes that perform one or more data protection removal processes, the portion of the executable code is identified a potentially including one or more unpacking variables. Based upon the disclosure provided herein, one of ordinary skill in the art will recognize a variety of heuristics that may be used to identify portions of executable code that potentially include unpacking variables.

Where at least one obfuscated code portion potentially including unpacking variables is found (block 304), the identified obfuscated code portion is referred to a code deobfuscating compiler for pre-unpack processing (block 306). In some embodiments, the code deobfuscating compiler operates similar to that discussed below in relation to FIGS. 4A-4B. The code deobfuscating compiler simplifies the identified obfuscated code portion to reveal any unpacking variables, and returns the deobfuscated code corresponding to the obfuscated code portion that was referred. The returned deobfuscated code is analyzed to identify any unpacking variables included therein (block 310). Such unpacking variables may be found, for example, in protected data access calls where the unpacking variable is a parameter of the protected data access call.

The identified unpacking variables are then used to access the protected data rendering the data no longer protected (block 312). This may be done, for example, by accessing data or code at the address indicated in the access call from which the unpacking variable was identified. Based upon the disclosure provided herein, one of ordinary skill in the art will recognize other approaches that may be used to access protected data using the identified unpacking variable(s). Unprotected data corresponding to the identified obfuscated code referred to the code deobfuscating compiler is provided (block 314).

Where, alternatively, no obfuscated code portion potentially including unpacking variables is found (block 304), the modified code (i.e., original executable code and where applicable unprotected data corresponding to portions of the original executed code (block 320).

The aforementioned processes of blocks 302-314 are repeated on the modified code (i.e., the original executable code plus any unprotected data) until all protected data has been accessed. As an example, the accessed data (block 312) may itself be obfuscated code hiding another unpacking variable. In such cases, repeating the processes of blocks 302-314 will operate to reveal another unpacking variable corresponding to another layer of obfuscation. Ultimately, all unpacking variables will be revealed and corresponding protected data re-written as unprotected data, both of which can be processed using static analysis.

Figure 4A:
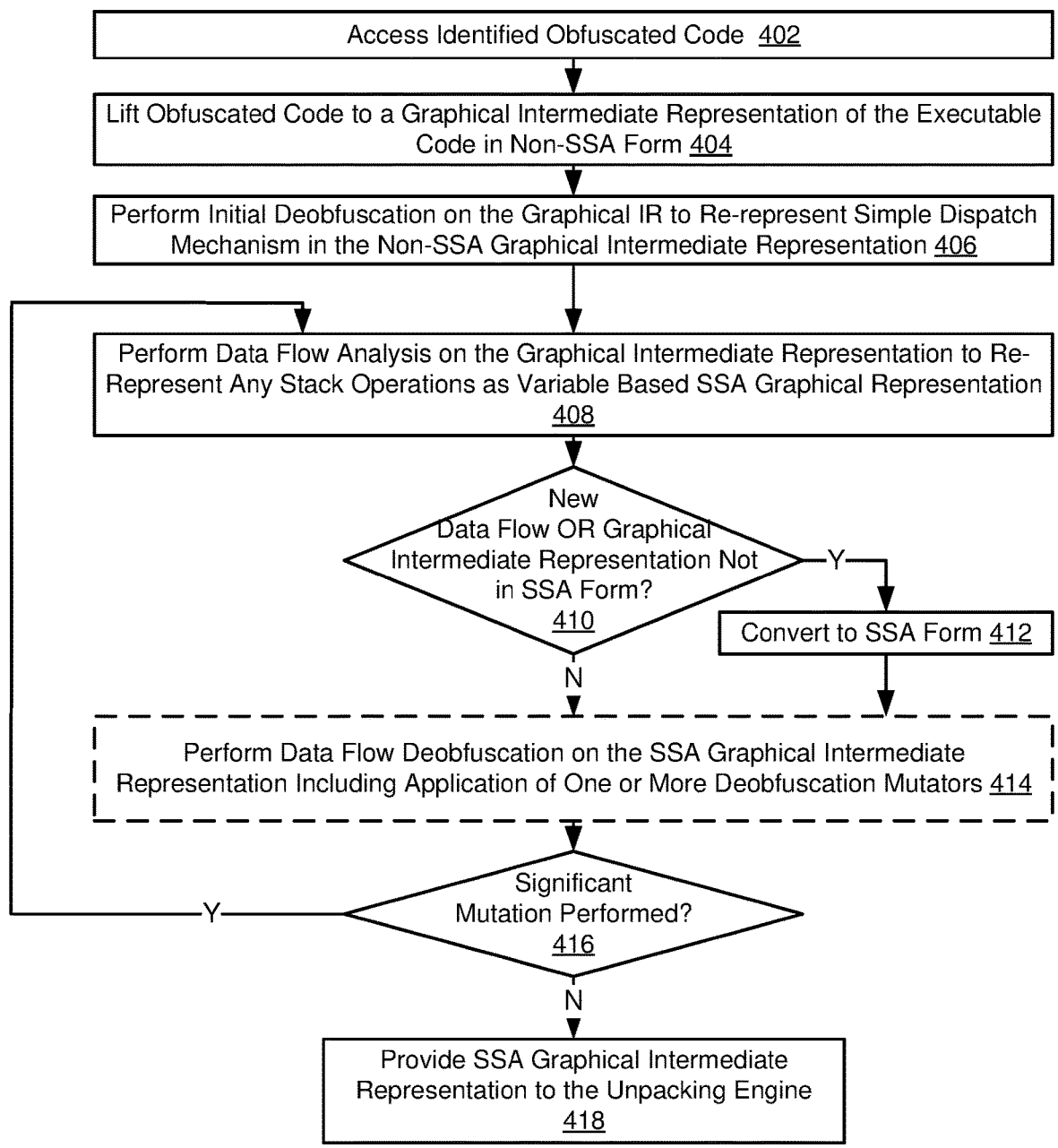
FIGS. 4A-4B is a flow diagram showing a method for code deobfuscating in accordance with various embodiments.
Figure 4B:
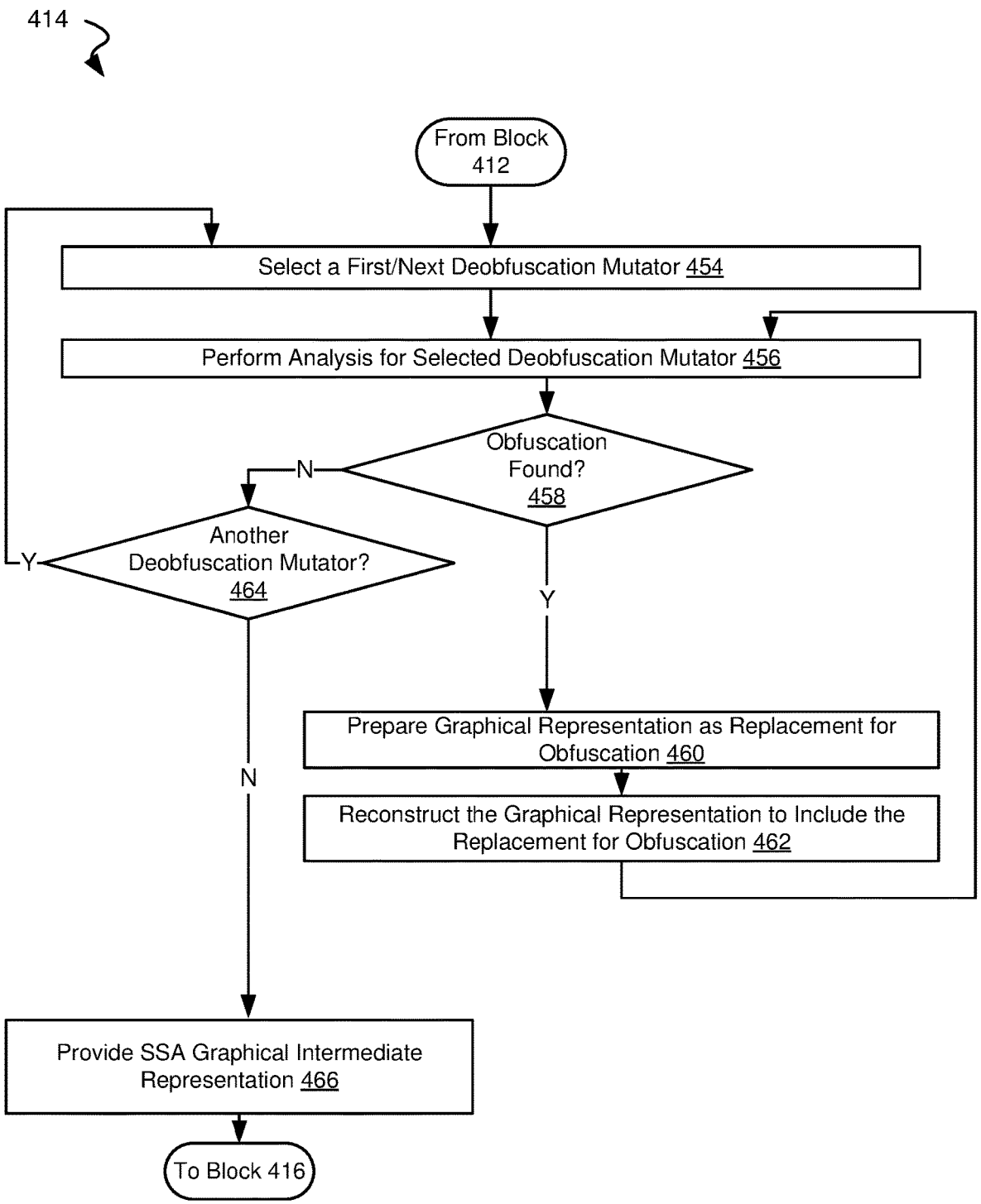

Turning to FIGS. 4A-4B, a flow diagram 400 shows a method for code deobfuscating in accordance with various embodiments. Following flow diagram 400, a portion of code identified as obfuscated is accessed (block 402). The identification of the obfuscated code may be provided by, for example, an unpacking engine that calls on a code deobfuscating compiler.

Figure 5:
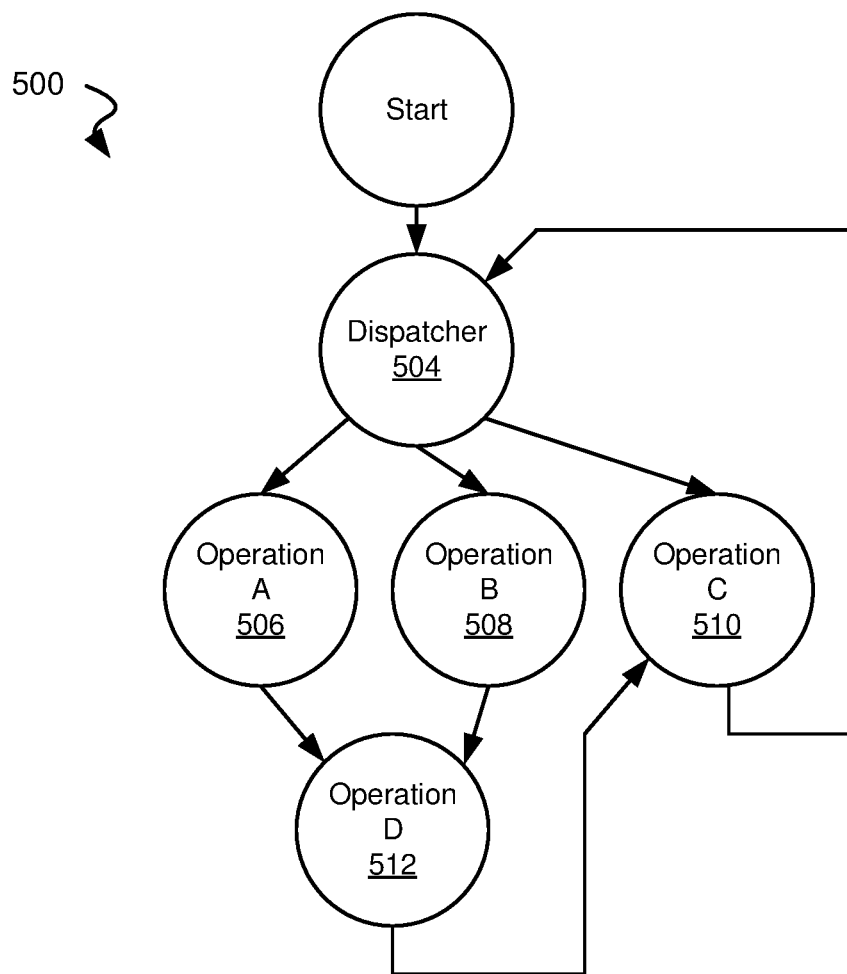
FIG. 5 shows an example graphical intermediate representation that may be created and/or processed in accordance with different embodiments.

The accessed obfuscated code is lifted to a graphical intermediate representation in a non-SSA form (block 404). The non-SSA graphical intermediate representation is behaviorally equivalent to the lower-level code that it represents. Such lifting of the obfuscated code may be from an executable code to, for example, LLVM or REIL as was discussed above. Turning to FIG. 5, an example of a graphical intermediate representation 500 of an executable code is shown. Graphical intermediate representation 500 shows a situation where three different values of a variable yielding three different possible branches: (1) a dispatcher 504 to an operation A 506, (2) dispatcher 504 to an operation B 508, and (3) dispatcher 504 to an operation C 510. When either operation A 506 or operation B 508 are completed, an operation D 512 is performed. Once operation D 512 is complete, operation C 510 is performed. Once operation C 510 is completed, the process returns to dispatcher 502 where the variable is tested again. As an example, graphical intermediate representation 500 may represent the following pseudocode where "x" is the variable tested by dispatcher 504:

```
x=0                /* Initialize */
while True
    switch(x)      /* dispatcher */
        case 0:
            x++    /* do operation A 506 */
            goto label d
        case 1:
            x++    /* do operation B 508 */
            label d:
            x++    /* do operation D 512 */
            fall-through
        case 2:
            x--    /* do operation C 510 */
            break
```

Dispatcher 504 may be referred to as a "dispatcher node" which as used herein is any node that is capable of branching to two or more nodes. To differentiate from dispatcher nodes, other nodes that do not branch are referred to as "operation nodes". Thus, operation A 506, operation B 508, and operation C 510 are referred to as operation nodes because they do not branch.

An initial deobfuscation process is performed on the graphical intermediate representation prior to converting the representation to an SSA form (block 406). This process is done by applying one or more deobfuscation mutators to the code to eliminate one or more simple deobfuscations (e.g., simplify control-flow when unnecessary branching occurs between nodes and there is no conditional branching present between the nodes, eliminate opaque predicates (i.e., eliminate branching with conditions that can be proven to only ever evaluate one way), eliminate behaviorally equivalent execution paths in an intermediate representation, forward propagate expressions when it is possible without changing behavior of the represented code, eliminate junk method calls in an obfuscated subroutine, eliminate unnecessary intermediate branching, and/or eliminate variables that are not really used). The changes made to the graphical intermediate representation at this juncture do not require subsequent applications of the same previously applied deobfuscation mutators to assure no additional deobfuscations are possible. The purpose of this process is to partially clean the obfuscated code before applying more complex and aggressive analysis algorithms. The code deobfuscation mutators may be any mutators known in the art. In some embodiments, the process uses one or more of the following mutators: BlockMerger, EliminateDuplicateBehavior, EliminateOpaquePredicates, ExpressionPropogation, InvokeCleaner, ProxyBranchEliminator, and/or SSAEliminateDeadVariables. BlockMerger is designed to simplify control-flow when unnecessary branching occurs between nodes and there is no conditional branching present between the nodes. EliminateDuplicateBehavior is designed to identify and eliminate behaviorally equivalent execution paths in an intermediate representation. EliminateOpaquePredicates is designed to eliminate opaque predicates (i.e., eliminate branching with conditions that can be proven to only ever evaluate one way). ExpressionPropogation is designed to forward propagate expressions when it is possible without changing behavior of the represented code. InvokeCleaner is designed to eliminate junk method calls in an obfuscated subroutine. ProxyBranchEliminator is designed to eliminate unnecessary intermediate branching. SSAEliminateDeadVariables is designed to eliminate variables that are not really used. Based upon the disclosure provided herein, one of ordinary skill in the art will recognize a variety of mutators (or transformation passes in LLVM compiler design) and/or combinations of mutators that may be used in relation to different embodiments.

With the simple obfuscations removed from the graphical intermediate representation (block 406), a data flow analysis is performed on the graphical intermediate representation to identify any stack operations, where possible to re-represent such stack operations in the native executable code where possible, and to create a corresponding variable based SSA graphical intermediate representation for the stack operation (block 408). In addition to replacing stack operations with variable based SSA graphical intermediate representations, the process modifies the variable based SSA graphical intermediate representations to SSA form.

It is determined whether the data flow analysis of block 408 revealed any new variables (e.g., a variable added to represent a stack operation) or if any portion of the graphical intermediate representation is not yet in SSA form (block 410). Thus, for example, on the first pass where the graphical intermediate representation is not in SSA form, the processes indicated by block 410 are triggered. As another example, where a stack operation was represented in block 408 by a variable based routine and the variable is new, the processes indicated by block 410 are triggered. In such situations (block 410), any portion of the graphical intermediate representation that is not already in SSA form is converted to SSA form (block 412). This conversion process may be done using any process for converting to SSA form known in the art. Based upon the disclosure provided herein, one of ordinary skill in the art will recognize a variety of SSA conversion processes that may be used in relation to different embodiments.

The SSA graphical intermediate representation is passed to a deobfuscation process (block 414). Block 414 is shown in dashed lines at it is represented by a flow diagram of the same number in FIG. 4B. As discussed in relation to FIG.

4B, the deobfuscation process recursively applies one or more deobfuscation mutators on the graphical intermediate representation.

Turning to FIG. 4B and following flow diagram 414, a first/next deobfuscation mutator is selected for application to the graphical intermediate representation (block 454). As mentioned above, a number of different obfuscation mutators may be applied including, but not limited to: BlockMerger, EliminateDuplicateBehavior, EliminateOpaquePredicates, ExpressionPropogation, InvokeCleaner, ProxyBranchEliminator, and/or SSAEliminateDeadVariables. In addition or in place of, a novel deobfuscation mutator CFFSolver may also be applied. In some embodiments, only the CFFSolver deobfuscation mutator is applied. Based upon the disclosure provided herein, one of ordinary skill in the art will recognize a variety of deobfuscation mutators that may be used in relation to different embodiments.

The analysis corresponding to the selected deobfuscation mutator is performed (block 456). The analysis reviews the graphical intermediate representation to identify any possible obfuscations that can be resolved by the selected deobfuscation mutator. Where an obfuscation is identified (block 458), a graphical representation that is behaviorally equivalent to the original obfuscated code but removes the obfuscation is prepared (block 460). The graphical intermediate representation is then reconstructed to include the prepared replacement (block 462). Where the graphical representation considered in block 458 is in SSA form, then blocks 460-462 will provide an output in SSA form. One of ordinary skill in the art will appreciate a variety of approaches to reconstruct SSA form.

The analysis for the selected deobfuscation mutator is re-performed (block 456) to determine if the obfuscation was successfully removed and/or if another obfuscation presented itself because of the changes made in the reconstructed graphical intermediate representation performed in block 462. Where another obfuscation is identified (block 458), the processes of blocks 458-464 are repeated for the same deobfuscation mutator.

Alternatively, where no obfuscation is found (block 458), it is determined whether another deobfuscation mutator remains to be applied (block 464). Where another deobfuscation mutator remains to be applied (block 464), the next deobfuscation mutator is selected for application to the graphical intermediate representation and the processes of blocks 456-464 are repeated for the next selected deobfuscation mutator. Alternatively, where no obfuscation was found (block 458) and no other deobfuscation mutators remain to be applied (block 464), the current reconstructed SSA graphical intermediate representation is returned (block 466). At this juncture, processing is returned to block 416 of FIG. 4A.

Returning to FIG. 4A, it is determined if the process of deobfuscation performed in block 414 resulted in modifying the SSA graphical intermediate representation in a significant manner (block 416). In some embodiments, any change in the SSA graphical intermediate representation is considered a change in a significant manner or a significant mutation performed. In one or more embodiments, any change made by a particular deobfuscation mutator is considered a change in a significant manner or a significant mutation performed as some deobfuscation mutators are designed to create more significant change than others. In one such embodiment, anytime any change is made by the CFFSolver deobfuscation mutator is considered a change in a significant manner or a significant mutation performed.

Where a significant mutation was performed (block 416), the processes of blocks 408-416 are repeated. The processes are repeated because a given code-deobfuscation mutator may not identify a given obfuscation if that obfuscation is hidden behind a different obfuscation pattern. If a significant mutation was performed, it means that it possibly revealed additional deobfuscation opportunities which can be resolved by repeating the processes of blocks 408-416. Alternatively, where a significant mutation was not performed (block 416), the SSA graphical intermediate representation is returned to the unpacking engine (block 418).

In various embodiments, the unpacking engine analyzes the SSA graphical intermediate representation directly. In various embodiments, the process of block 418 can be enhanced to return an enhanced or otherwise augmented SSA graphical intermediate representation to facilitate additional analysis by the unpacking engine. For example, Just-In-Time (JIT) compiling is applied to select portions of the SSA graphical intermediate representation to provide an output intermediate representation in an executable code format. Such allows some unpacking Algorithms to perform targeted execution on small or select snippets of the deobfuscated code very quickly. As another example, a list of all uses of a particular variable (def-use) is available throughout the deobfuscation processes of FIGS. 4A-4B, and is made available to the unpacking engine along with the SSA graphical intermediate representation. Such allows the unpacking engine to perform deeper static analysis on the deobfuscated code. As yet another example, an abstract interpreter may be provided for the produced SSA graphical intermediate representation. As yet a further example, the SSA graphical intermediate representation may be compiled into a textual form with a control-flow graph that may be analyzed by human analysts trying to understand or reverse engineer the original obfuscated code.

Figure 6A:
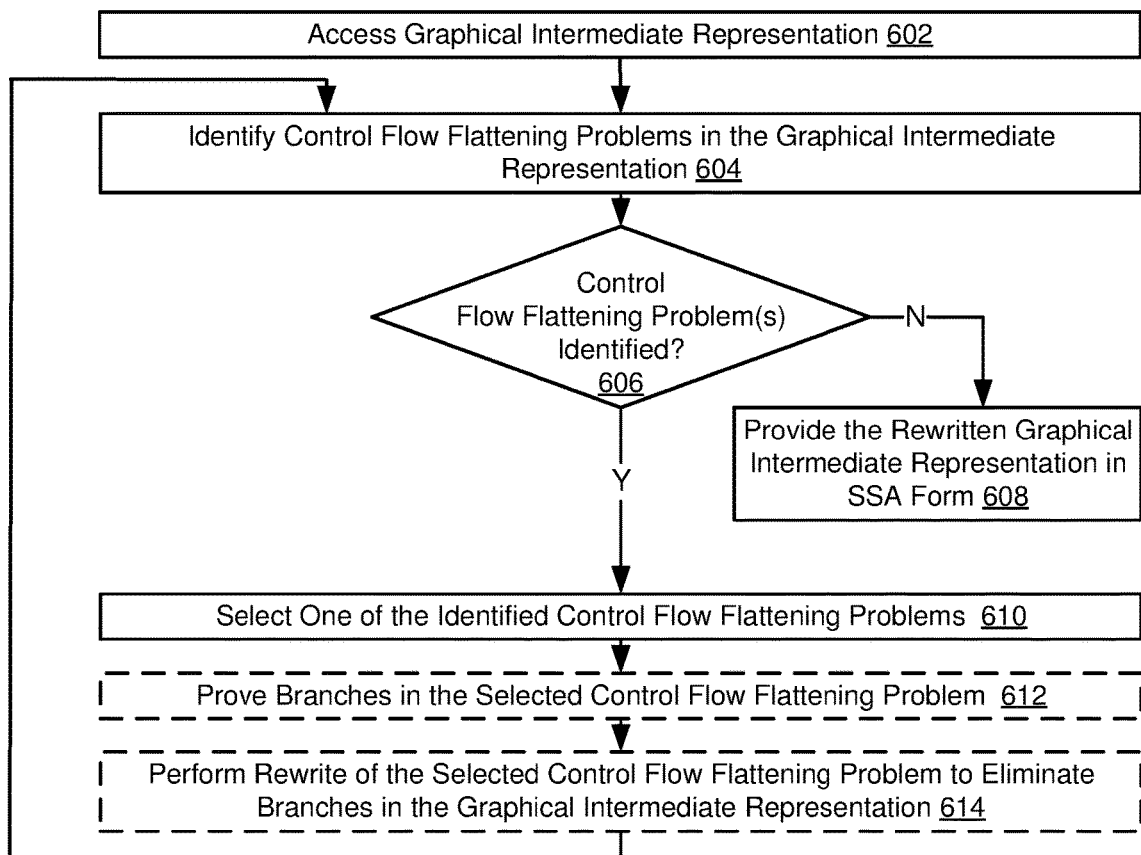
FIGS. 6A-6C is a flow diagram of a method for control flow flattening deobfuscation in accordance with some embodiments.
Figure 6B:
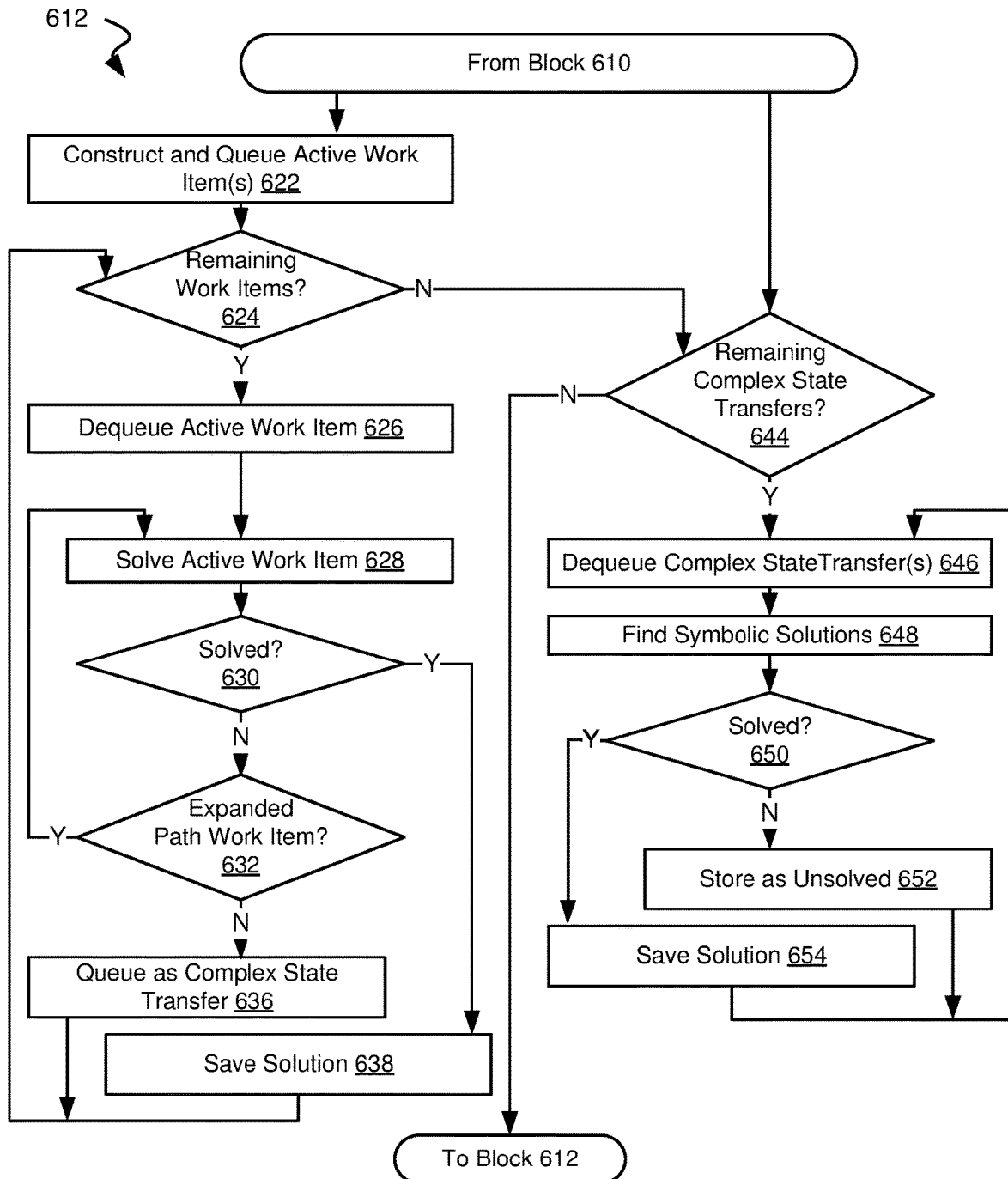
Figure 6C:
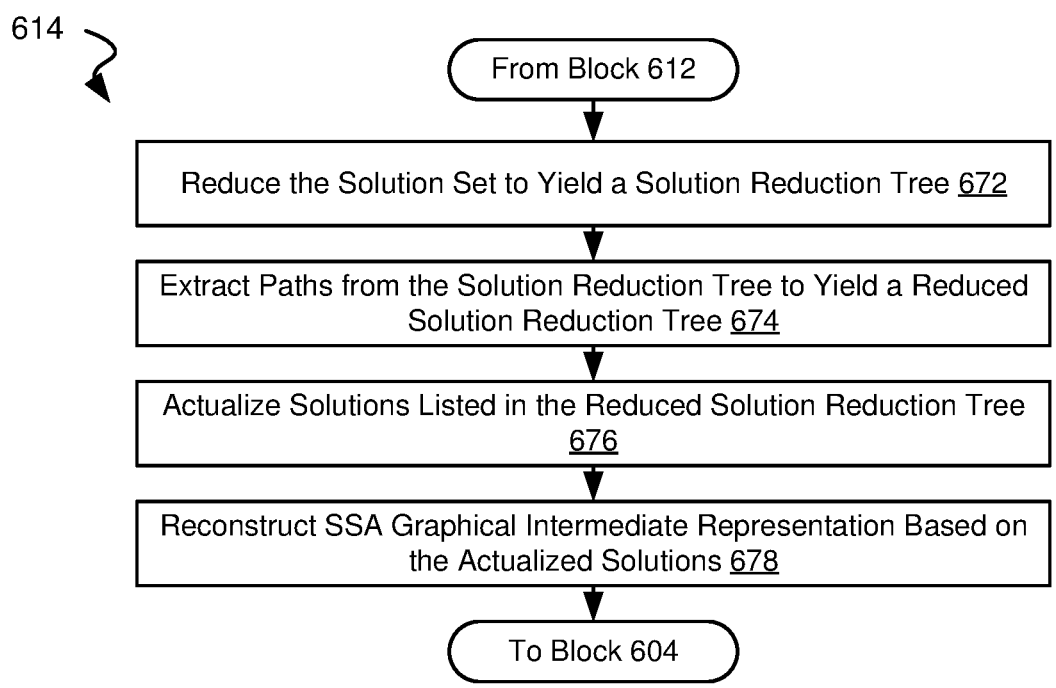
Figure 7:
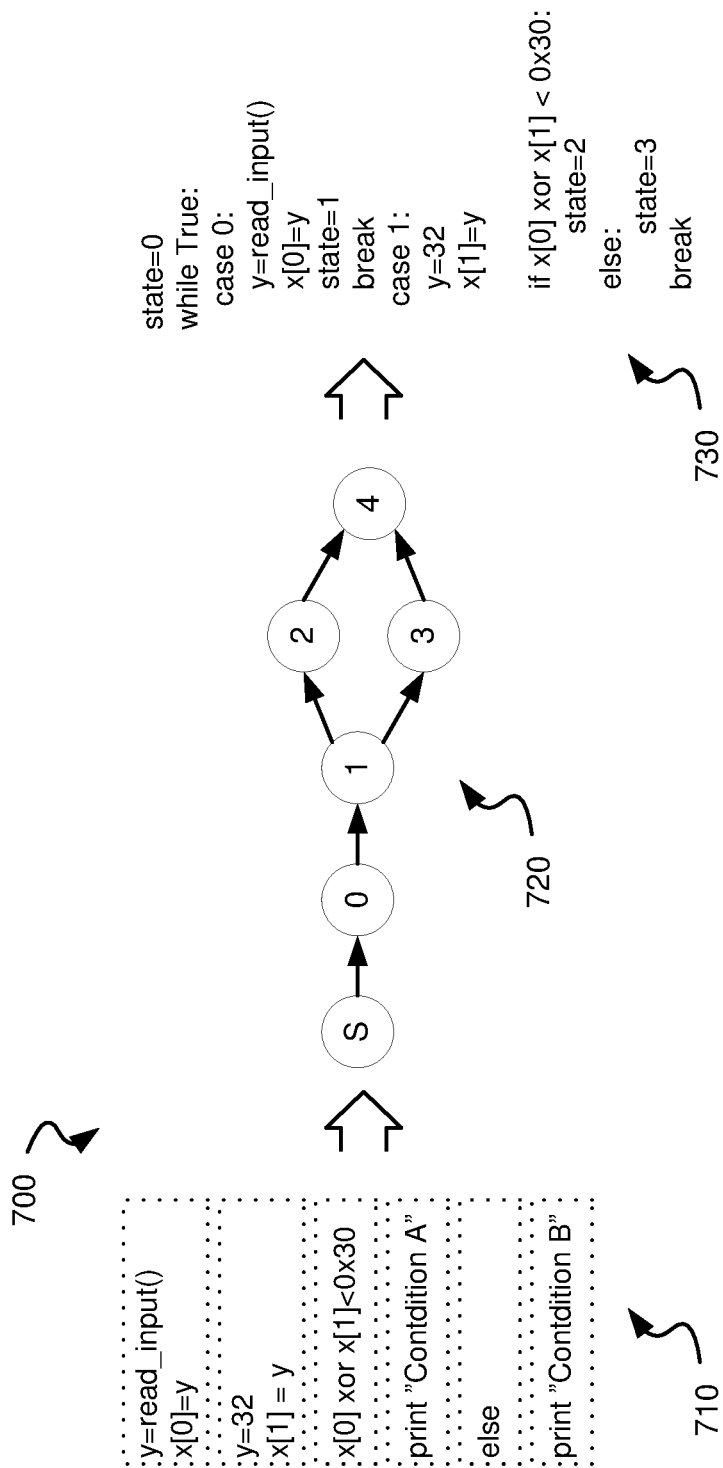
FIG. 7 shows an example, code flow flattening obfuscation process that may be used by entities attempting to obfuscate code.

Operation of the aforementioned CFFSolver deobfuscation mutator is shown in FIGS. 6A-6C which is a flow diagram 600 showing a method for control flow flattening deobfuscation in accordance with some embodiments. As background, a control flow flattening obfuscation pattern is a powerful approach to prevent static code analysis with respect to control-flow and data-flow information. Without being able to perform useful static data-flow or control-flow analysis, the type of analysis that may be performed on code is very limited. Turning to FIG. 7, a simplified model 700 of control flow flattening obfuscation is shown that may be used by one trying to obfuscate their code. Following model 700, the code 710 to be protected 710 is modeled as a state-machine 720. Each basic block (or extended blocks) in code 710 is mapped to a respective state in state-machine 720. Each branch between a basic block (or extended basic blocks) is mapped as a state-transition. The one trying to obfuscate their code then generates a state-machine interpreter, which is responsible for handling state-transitions and triggering the execution of the basic blocks mapped to each state as the states are transitioned to. Branching instructions are re-written as state-transitions. The one trying to obfuscate their code embeds this state-machine interpreter, as well as the basic blocks into a newly produced subroutine code 730. After the control flow flattening obfuscation has been performed, all control-flow of the original basic blocks from the source subroutine is directly handled by the embedded state-machine interpreter (i.e., a dispatcher). Without intimate knowledge of how this generated state-machine works, it is not possible to recover the control-flow of the original code. It is noted that the precise manner in which the generated state-machine works is not consistent across entities that obfuscate their code. For example, the state-machine generated by O-LLVM is vastly different than that produced by .Net Reactor. This presents a challenge because implementing a solution that works for all applications of control flow flattening obfuscation becomes very complex if we must accommodate various possible state-machine architectures.

Turning to FIG. 6A and following flow diagram 600, a graphical intermediate representation is accessed (block 602). In some cases, this graphical intermediate representation is that existing in memory at the time the CFFSolver deobfuscation mutator is called (e.g., FIG. 4B, block 454).

Control flow flattening problems in the graphical intermediate representation are identified (block 604). This process includes analyzing the graphical intermediate representation to first identify all control flattening problem dispatcher nodes, and then prioritize the identified dispatcher nodes using a heuristic. In some embodiments identification of control flattening problem dispatcher nodes is done by applying Tarjan's strongly connected components algorithm. Tarjan's strongly connected components algorithm is an algorithm well known in the art for finding the strongly connected components of a directed graph (and by implication single unconnected nodes that are ignored). The algorithm takes a directed graph such as the graphical intermediate representation as an input, and produces a partition of the graph's vertices into the strongly connected components of the graph. Each vertex of the graph appears in exactly one of the strongly connected components. Any vertex that is not on a directed cycle forms a strongly connected component all by itself: for example, a vertex whose in-degree or out-degree is zero (0), or any vertex of an acyclic graph. Sets of strongly connected components are identified as subtrees of the graph, and the roots of the identified subtrees are themselves identified as dispatcher nodes. As used herein, the term "dispatcher" is used in its broadest sense to mean a single node in a control flow flattening problem that has either multiple predecessors or successors). Of the identified dispatchers, they are prioritized heuristically by usefulness or effectiveness.

The following pseudocode represents a process for identifying control flow flattening problems and identify control flow dispatchers:

```
def find_cff_dispatchers(ir):
    loops = find_scc_groups(ir) where group consist of at least 2 nodes
    self_loops = all nodes n in ir where n has a successor n
    headers = [ ]
    for l in (loops + self_loops):
        origin = l[0]
        container = l
        n = find_complexity_threshold(origin, container)
        if n is None:
            continue
        headers.append(n)
    sort_by_dominance(headers)
    return headers
def find_complexity_threshold(start, container):
    visited = set( )
    origins = queue( )
    origins.push(start)
    candidates = [ ]
    while origins:
        n = origins.pop( )
        if n in visited:
            continue
        visited.add(n)
        for s in (n.successos − visited) ∩ container:
            origins.push(s)
        if len(n.successors) >= 2:
```

-continued

```
            candidates.add(n)
    if len(candidates) == 0:
        return None
    return first(candidates ordered by predecessor count in descending
        order)
```

The aforementioned algorithm to find control flow flattening problems and identify dispatchers includes identifying all groups of strongly connected components, which includes filtering out any groups consisting of only a single item; and also all nodes which loop back to themselves. In the case of nodes that loop back to themselves, the group is a single item including just the one node which self-loops. For each group, iteration through the nodes in that group is performed and an attempt to heuristically identify one node in the group which would best serve as the dispatcher node.

The selected dispatcher nodes node selected, we sort them in order of dominance. The dispatcher nodes are sorted such that those belonging to outer loops occur at the start of the sorted collection and dispatcher nodes belonging to more inner loops have their respective headers appear closer to the end of the sorted collection. Such a sorting process may be implemented consistent with the following pseudocode:

```
return from x in loops
    orderby loops.count(y => y != x && x.ImmedateDominated.
    Contains(x))
descending select x;
```

The purpose of such sorting is to improve performance. Inner control flow flattening loops are less likely to be actual control flow flattening obfuscations. In contrast, outer loops tend to exhibit a higher likelihood being control flow flattening obfuscations or problems. Items in the returned collection are prioritized respective to their location in the collection. Items at the start are higher priority to be solved than items near the end.

It is determined whether any control flow flattening problems and corresponding dispatchers were identified (block 606). Where a control flow flattening problem was identified (block 606), one of the identified control flow flattening problems is selected for processing (block 610). In some embodiments, the selection involves selecting the dispatcher that exhibited the highest likelihood of being associated with a control flow flattening problem. In particular embodiments, this includes selecting the dispatcher that is highest in the ordered list of dispatchers yielded from the preceding sorting pseudocode.

The branches in the selected control flow flattening problem are proved (block 612). Such branch proving involves performing calculations to collect the branching behavior of the selected dispatcher node in its entirety. In particular the realized branching behavior immediately after executing the dispatcher associated with the selected control flow flattening problem given the state produced after executing through any path p through the graphical intermediate representation to the dispatcher node. Block 612 is shown in dashed lines as it is represented by a flow diagram of the same number in FIG. 6B.

Turning now to FIG. 6B and following flow diagram 612, active work items are constructed and queued (block 622). Each path through to the dispatcher node is referred to herein as a "work item". Referring again to FIG. 5, two paths including a predecessor to the selected dispatcher (i.e., dispatcher 504) are possible:

(1) Start→Dispatcher 504; and (2) Operation C 510→Dispatcher 504.

For simplicity, operation A 506 is referred to simply as A, operation B 508 is referred to simply as B, operation C 510 is referred to simply as C, and operation D 512 is referred to simply as D. It will be appreciated that without constraint, there is an infinite number of paths through dispatcher 504 where the paths are allowed to repeat through dispatcher 504 including, for example:

(i) Start→dispatcher 504;

(ii) Start→dispatcher 504→A→D→C→dispatcher 504;

(iii) A→D→C→dispatcher 504→C→dispatcher 504→A; etc. . . . . .

To eliminate this unnecessary complication, any work item is limited to a path, p, such that:

(1) the path cannot pass through the dispatcher, but must end at the dispatcher; and (2) any given node (e.g., A, B, C, D, dispatcher 504) must only appear in the path once, and thus internal looping within a given path is not allowed.

While the aforementioned constraints substantially limit the number of paths for any graphical intermediate representation that are identified as work items, the purpose the control flow flattening deobfuscation of FIGS. 6A-6C is to effectively prove all paths of execution through the selected dispatcher. This means that the branching behavior for the selected dispatcher must be completely known or the problem is not considered solved. Solving all paths relies on an understanding that having solved a subset of the paths, all paths have been considered. For example, if the path D-Dispatcher 504 has realized the branching behavior of D→Dispatcher 504→C, then it can be considered that any path *→D→Dispatcher 504 (where * is any path in the graphical intermediate representation to node D) will have the branching behavior of *→D→Dispatcher 504**→C. This ability to imply the branching behavior for all paths based upon the constrained work items allows for efficient processing.

As will be appreciated, if the aforementioned path (2) above (i.e., C→Dispatcher 504) can be solved, then the following paths are also solved as they all travel via the same common path (i.e., C→Dispatcher 504):

(a) A→D→C→Dispatcher 504; and (b) B→D→C→Dispatcher 504.

However, if the path C→Dispatcher 504 cannot be solved, the an expansion is required to step back an prove each of the above paths (a) and (b) individually.

At this juncture in FIG. 6, the constructing and queuing only involves creating an initial set of work items for predecessors of the selected dispatcher node. The following pseudocode shows an example of constructing and queueing that may be used in relation to different embodiments.

```
pending_resolution = queue( )
    # Build initial set of work items
    for predecessor p to dispatcher:
        if p == dispatcher:
            continue
        work_item = WorkItem(path p to dispatcher)
        pending_resolution.add( work_item )
```

The aforementioned algorithm is responsible for creating the initial set of work items that represent paths through the selected dispatcher node. As more fully discussed below, such work items are either eventually solved, or if they cannot be solved they are queued as "complex state transfers". A work item is considered solved when the dispatching behavior of the selected dispatcher node is known for the path defined as the work item.

It is determined whether any work items remain in the queue to be processed (block 624). Where at least one work item remains in the queue for processing (block 624), the next work item in the queue is removed from the queue for processing (block 626) and an attempt is made to solve the accessed work item (block 628). An attempt to solve the work item includes analyzing the path represented by the work item using an abstract interpreter. Any abstract interpreter known in the art may be used. As is known in the art, the abstract interpreter collects information about the state produced along the respective path if it were to be executed. The collected information is then used with the dispatching logic in the selected dispatcher node to test if the branching behavior realized by the selected behavior can be completely predicted (i.e., proved).

Where the collected information allowed for complete prediction of the branching behavior, the work item is considered solved (block 630). Where the work item was solved (block 630), the solution is stored for later use (block 638) and the process returns to block 624 and repeats from there where additional work items remain to be processed.

Alternatively, where the work item was not solved (block 630), it is determined whether an expanded path is available for the unsolved work item (block 632). The expanded path is a superset of the path associated with the work item that was not solved. In some cases, the expanded path results in more than one work item and in such cases the additional work items are processed separately. Regardless of the number work items generated, it is possible that a larger path for any of the work items will result in more state information collected by the abstract interpreter, and thus enhance the ability to solve the work item. Defining an expanded path conforms to the following three rules (where p refers to the path of the originating failed work item):

(i) If no expanded paths exist that conform to the work item constraints (1) and (2) discussed above, no expanded path is possible.

(ii) Where there is a single predecessor node to the first node of path p and this single predecessor node can be prepended to the path of the failed work item without violating the work item constraints (1) and (2) discussed above, the unsolved work item is replaced with a new work item that includes the single predecessor node prepended to the unsolved work item (e.g., path A→B is replaced with path predecessor→A→B).

(iii) Where there are two or more predecessor nodes to the first node in path p, of which neither would violate the work item constraints (1) and (2) discussed above if prepended to the path of the unsolved work item, multiple expanded paths are created with one for each of the predecessor nodes (e.g., path A→B is replaced with paths predecessor 1→A→B and predecessor 2→A→B), and all of the new paths are proven.

Figure 8:
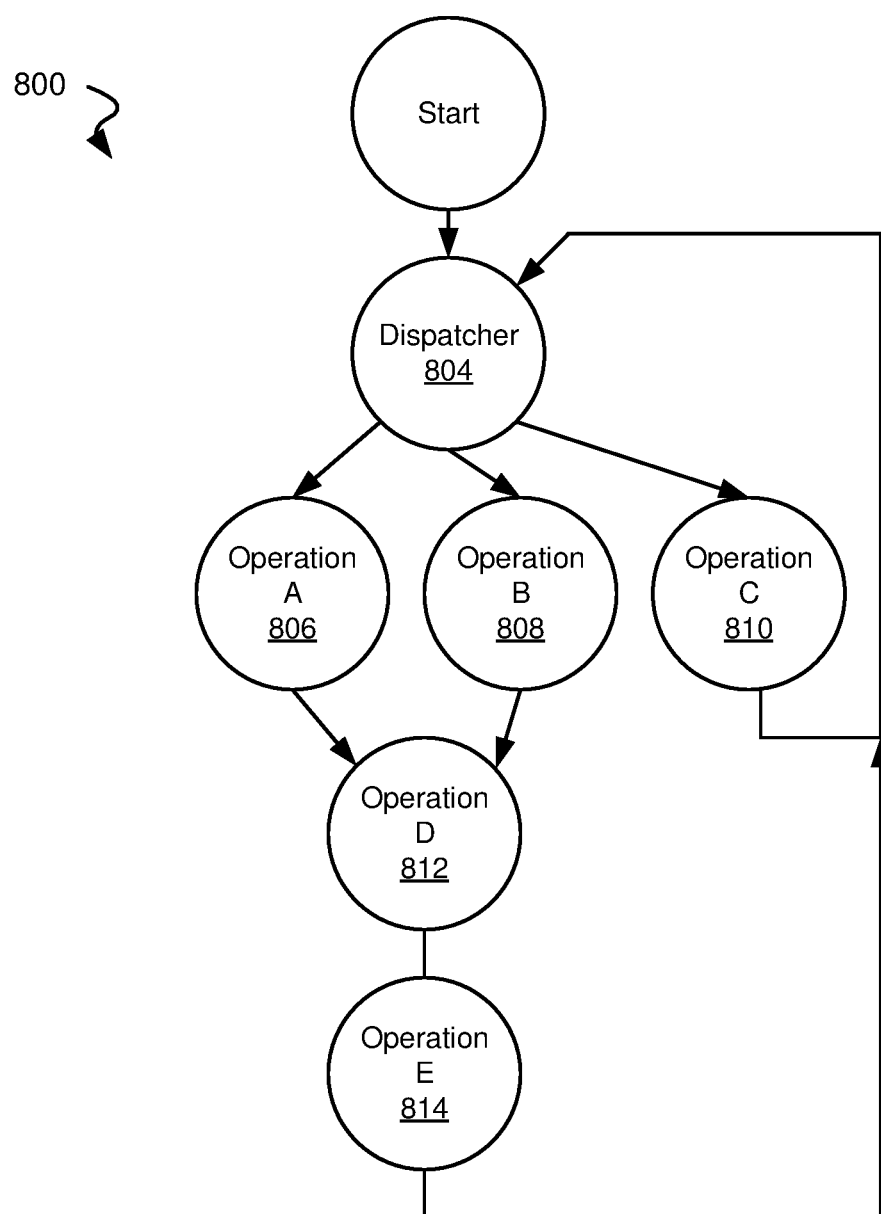
FIG. 8 shows another example graphical intermediate representation that may be created and/or processed in accordance with different embodiments.

Turning to FIG. 8, an example of a graphical intermediate representation 800 of an executable code is shown. Graphical intermediate representation 800 shows a situation where three different values of a variable yielding three different possible branches: (1) a dispatcher 804 to an operation A 806, (2) dispatcher 804 to an operation B 808, and (3) dispatcher 804 to an operation C 810. When either operation A 806 or operation B 808 are completed, an operation D 812 is performed. Anytime operation D 812 is performed, an operation E 814 is performed. Once either operation C 810 or operation E 814 is completed, the process returns to dispatcher 804 where the variable is tested again. For simplicity, operation A 506 is referred to simply as A, operation B 508 is referred to simply as B, operation C 510 is referred to simply as C, operation D 512 is referred to simply as D, and operation E 514 is referred to simply as E.

Referring to FIG. 8 to make an example of expanded path case (i) above (discussed in relation to block 632 of FIG. 6B above), assume the unsolved work item was C→Dispatcher 804. In this case, it would not be possible to expand the unsolved work item because stepping to a predecessor would result in an expanded path of Dispatcher 804→C→Dispatcher 804. Such a path does not comply with the work item constraints (1) and (2) discussed above, and thus an expanded path does not exist.

Referring again to FIG. 8 to make an example of expanded path case (ii) above (discussed in relation to block 632 of FIG. 6B above), assume the unsolved work item was E→Dispatcher 804. In this case there is a single predecessor node D that when prepended to the unsolved work item will comply with the work item constraints (1) and (2) discussed above, and thus the following expanded path is processed: D→E→Dispatcher 804.

Referring again to FIG. 8 to make an example of expanded path case (iii) above (discussed in relation to block 632 of FIG. 6B above), assume the unsolved work item was D→E→Dispatcher 804. In this case there are two predecessor nodes (node A and node B) that when prepended to the unsolved work item will comply with the work item constraints (1) and (2) discussed above. In this case, two work items are created and processed: (1) A→D→E→Dispatcher 804, and (2) B→D→E→Dispatcher 804.

Referring again to FIG. 6B, where an expanded path is available to process (block 632), the expanded path work item is solved (block 628) and the processes of blocks 628-632 are repeated for the expanded path work item. Alternatively, where no expanded path work item is possible (block 632), the unsolved work item is queued as a complex state transfer (block 636) and the process returns to block 624 and repeats from there where additional work items remain to be processed.

The processes of blocks 622-638 are collectively referred to herein as "concrete solving" using an abstract interpreter. Such concrete solving only produces solutions for paths that always render the same behavior by the selected dispatch node. Namely, concrete solving can find a solution for a work item of a given path p to the selected dispatch node if execution along the path will always result in the dispatcher branching to a single given node—i.e., a node X. Thus, such concrete solving only produces solutions in the form of— execution along the given path p to the dispatch node will always result in the dispatch node branching to the determined node X.

Figure 9:
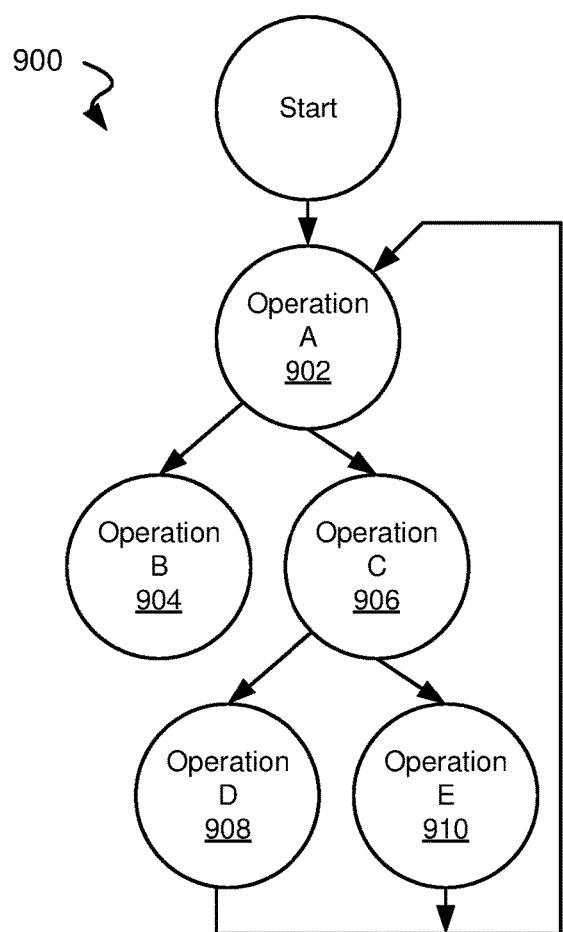
FIG. 9 shows an example graphical intermediate representation of an unsolvable work item that may occur in relation to different embodiments.

However, if the selected dispatch node is sufficiently complex, execution via a given path p to a dispatcher might realize a different branching behavior possibilities that are each dependent on some internal state. A simple example of this is shown in FIG. 9 which shows an example graphical intermediate representation 900 of an unsolvable work item that may occur in relation to different embodiments. As shown, graphical intermediate representation 900 shows a situation where a two way branch is possible from an operation A 902 to either operation B 904 or operation C 906. Operation B 904 is terminal. Operation C 906 has a two way branch possible to either an operation D 908 or an operation E 910. Each of operation D 908 and operation E 910 return to operation A 902. For simplicity, operation A 902 is referred to simply as A, operation B 904 is referred to simply as B, operation C 906 is referred to simply as C, and operation D 908 is referred to simply as D, and operation E 910 is referred to simply as E.

Referring to FIG. 9, assume A is defined as the dispatcher node. The work item representing the path D→A can be solved using the concrete solving process of blocks 622-638 of FIG. 6B, because the dispatching behavior realized by the state caused by execution of D will always result in the dispatcher (i.e., A) branching to B. However, the work item representing the path E→A will not be solved by the concrete solving process of blocks 622-638 of FIG. 6B. In fact, the concrete solving for this work item will fail after passing through two iterations of blocks 638-636 of FIG. 6B (the first iteration operating on work item E→A, and the second iteration operating on an expanded path work item of C→E→A). The reason the work item will not be solved is because the branching behavior at the dispatch node (i.e., A) from E will depend on the previous state of the "x" variable, which cannot be definitely defined or determined by just looking at execution along (C→E→A). Thus, the work item for the path C→E→A will be queued as a complex state transfer.

Returning to FIG. 6B, in parallel to blocks 622-638 (concrete solving using an abstract interpreter), queued complex state transfers are accessed and processed using symbolic solving using a symbolic execution engine. Such symbolic solving begins by determining whether any complex state transfers (i.e., previously an unsolved work items) remain to be processed (block 644). Thus, anytime the previously described concrete solving fails to resolve a work item resulting the queuing of a complex state transfer (block 636), the processes of symbolic solving may begin.

Where a complex state transfer is available for processing (block 644), the next complex state transfer is removed from the queue for processing (block 646) and an attempt is made to find a symbolic solution for the complex state transfer (block 648). An attempt to find a symbolic solution for the complex state transfer includes processing the complex state transfer using a symbolic execution engine as are known in the art. Any symbolic execution engine known in the art may be used. As is known in the art, such a symbolic execution engine is configured to analyze the complex state transfer to determine what inputs cause each part of the complex state transfer to execute. In operation, the symbolic execution engine assumes symbolic values for inputs rather than obtaining actual inputs as is done by the aforementioned abstract interpreter. It thus arrives at expressions in terms of those symbols for expressions and variables in the program, and constraints in terms of those symbols for the possible outcomes of each conditional branch. Ultimately, the possible inputs that trigger a branch can be determined by solving the aforementioned constraints. Where the constraints can be completely resolved, the complex state transfer is considered solved.

Referring again to the example of FIG. 9 where the work items C→E→A and E→A could not be solved using the concrete solving of blocks 622-638 of FIG. 6B, a solution is possible using the symbolic processing of blocks 644-654 of FIG. 6B. In particular, such symbolic solving will produce the following multi-part solution:

Execution along the given path (Node C→Node E) to the dispatcher (Node A) will always result in the dispatcher branching to:
Node B: if $x>=1$ or $x<=-1$; or
Node C: for all other values of x.

This is a simplification as it factors out the stop variable which can be proven symbolically must be false if there is to be any possibility of reaching E. Expanding the aforementioned example solution, symbolic solving is capable of producing solutions in the form of:

Execution along a given path p to the dispatcher will always result in the dispatcher branching to:
Node $<T_0>$: $<$Conditional Constraint $C_0>$
Node $<T_1>$: $<$Conditional Constraint $C_1>$
Node $<T_N>$: $<$Conditional Constraint $C_N>$ Symbolic solving has built in constraints that will prevent it from producing solutions that are excessively complex. If these constraints are reached, then the symbolic solver will mark the item as unsolvable. The reason we block the symbolic solver from creating excessively complex solutions is that this usually means that it has not been able to sufficiently or meaningfully solve the work item. It is also computationally expensive to compute complex symbolic solutions.

Returning to FIG. 6B, it is determined whether the complex state transfer was symbolically solved (block 650). Where the complex state transfer was symbolically solved (block 650), the solution is saved (block 652). Alternatively, the complex state transfer was not solved (block 650), the complex state transfer is stored to an unsolved queue (block 652).

Returning to FIG. 6A, a rewrite of the selected control flow flattening problem to eliminate branches in the graphical intermediate representation (block 610). The rewrite processes of block 614 (i.e., the processes of FIG. 6C) aggregate all of the solutions (consisting of both solved and unsolved work items) produced in blocks 628, 648 of FIG. 6B to rewrite the graphical intermediate representation so that the graphical intermediate representation better reveals the branching behavior reflected in the solutions.

Block 614 is shown in dashed lines as it is represented by a flow diagram of the same number in FIG. 6C. Turning to FIG. 6C and following flow diagram 614, the solution set produced in blocks 628, 648 of FIG. 6B are reduced to yield a solution reduction tree (block 672). In some cases, the solution set produced in blocks 628, 648 of FIG. 6B, while rewritable directly, are not optimal and it is thus more efficient to optimize using a solution reduction tree. This is due to a subtle difference in how the paths are produced by the branch proving processes of FIG. 6B and how they are consumed by the branch rewriting processes of FIG. 6C. The solutions produced in blocks 628, 648 of FIG. 6B is a set of subpaths to the selected dispatcher node corresponding to the branching behavior immediately realized by the dispatcher node given execution that occurred via the associated subpath.

Figure 10:
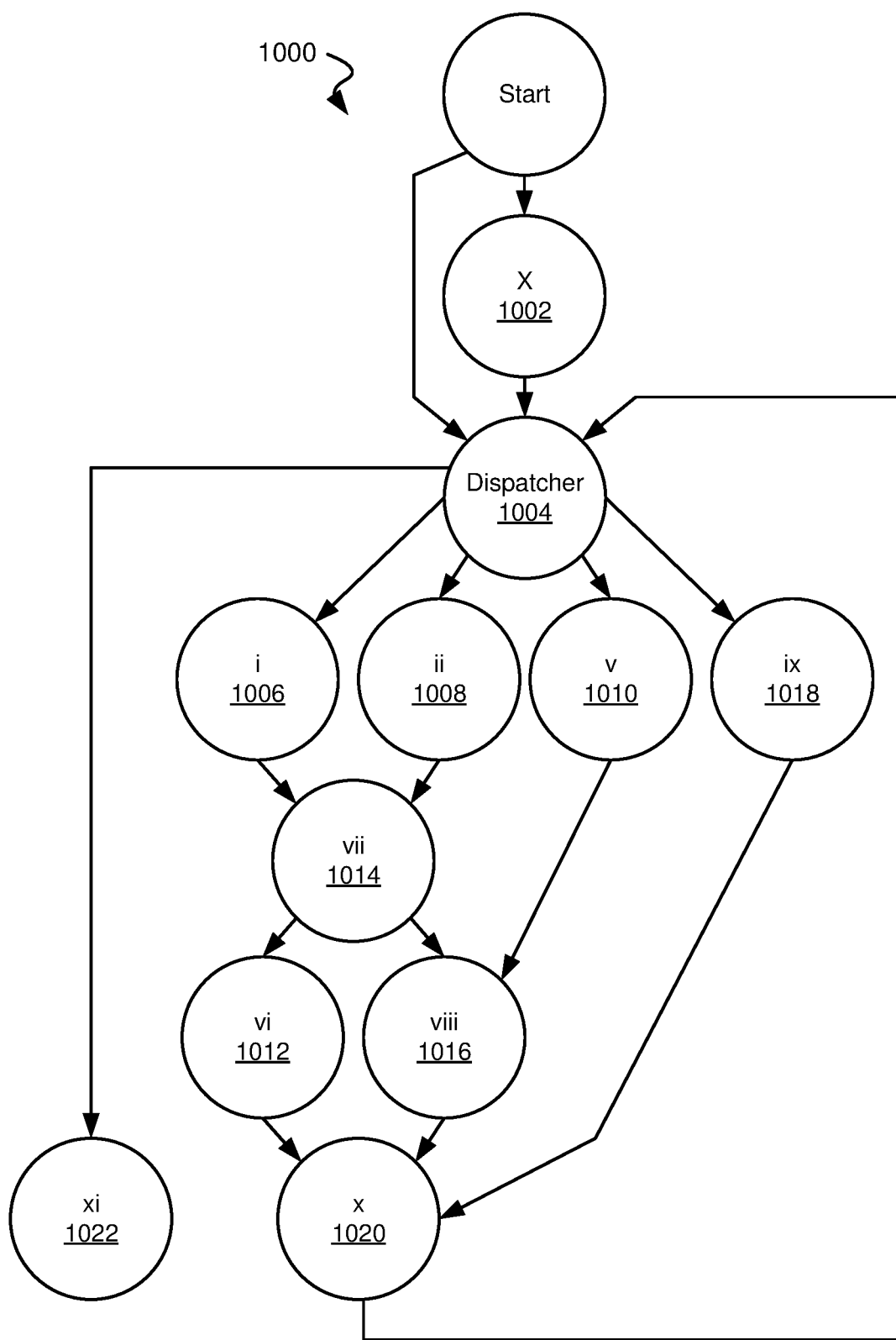
FIG. 10 shows an example of a control flow graph used to describe a simplification of solutions presented as part of proving paths within a graphical intermediate representation.

Turning to FIG. 10, a simple example of a control flow graph 1000 is shown that is used to describe a simplification of solutions presented as part of proving paths within a graphical intermediate representation. Control flow graph 1000 shows multiple control flow nodes (i.e., an X control flow node 1002, a dispatcher control flow node 1004, an i control flow node 1006, an ii control flow node 1008, an v control flow node 1010, an vi control flow node 1012, an vii control flow node 1014, an viii control flow node 1016, an ix control flow node 1018, an x control flow node 1020, and an xi control flow node 1022. For simplicity, control flow node i 1006 is referred to simply as i, control flow node ii 1008 is referred to simply as ii, control flow node v 1010 is referred to simply as v, control flow node vi 1012 is referred to simply as vi, control flow node vii 1014 is referred to simply as vii, control flow node viii 1016 is referred to simply as viii, control flow node ix 1018 is referred to simply as ix, control flow node x 1020 is referred to simply as x, and control flow node xi 1022 is referred to simply as xi. The solutions produced in blocks 628, 648 of FIG. 6B may include the following:

| Path | Solution |
| --- | --- |
| i, vii, vi, x | 9 |
| i, vii, viii, x | 9 |
| i, vii, vi, x | 9 |
| i, vii, viii, x | 9 |
| v, viii, x | 9 |

In this case where all of the paths correspond to the same solution, rather than write code for five possible paths (i.e., (1) i, vii, vi, x, (2) i, vii, viii, x, (3) i, vii, vi, x, (4) i, vii, viii, x, and (5) v, viii, x), the above solutions may be reduced to the following:

| Path | Solution |
| --- | --- |
| x | 9 |

This reduction means that only paths that include node x need to be rewritten. In this example, this results in rewriting only the branching behavior of node x, and thus significantly reduces the complexity of the rewrite, and ultimately any downstream deobfuscation process.

Returning to FIG. 6C, the process of reducing the solution set to yield a solution reduction tree (block 672) involves application of an algorithm which maps the solutions (consisting of all solved and unsolved work items) onto a set of Directed Trees and then traverses said trees later to find the simplest set of solutions to be rewritten. In particular, to reduce the solution set produced in blocks 628, 648 of FIG. 6B one or more directed tree structures as are known in the art are created. Such directed tree structures are created by iterating the paths contained in the solution set. For each path (P) corresponding to a solution in the solution set (solutions derived either from the aforementioned concrete solving or the aforementioned symbolic solving, or unsolved work items which have 'Unknown' solutions) the corresponding path is taken and traversed in reverse. For each node ($P_n$) that is visited along the path Path (P) the following processes are performed:

1. (process (1)) Check if there is a node $R_n$ in the solution reduction graph that corresponds to the control flow node $P_n$. If the corresponding control flow node $P_n$ is not the first node in traversal of path P, this node $R_n$ is additionally connected to node $R_{n-1}$ with the directed edge ($R_{n-1}$, $R_n$).
   a. If there does exist a node $R_n$ matching the criteria of process (1), check if that node is associated to a solution that is compatible with the solution of the path that is currently being traversed.
      i. If it is compatible, then leave the association intact
      ii. If it is not compatible, node $R_n$ is disassociated from all solutions
      iii. A path with an "Unknown" solution always results in the respective node $R_n$ being disassociated from all solutions
   b. If there does not exist a node $R_n$ matching above criteria, the following actions are performed:
      i. Create a new node $R_n$ in the solution reduction tree and associate it to node $P_n$ ii. We associate the newly created node $R_n$ to the solution associated to Path P (or Unknown if Path P is associated to an Unsolved Work Item)
iii. If this is not the first node in path P that is being traversed, a new directed edge ($R_{n-1}$, $R_n$) is created in the solution reduction tree 2. (process (2)) For each node n in the path P, process (1) is repeated. In each subsequent iteration of process (1), $R_{n-1}$ is assigned to $R_n$ of the previous iteration.

3. (process (3)) If the last node visited in the process corresponds to a solved solution (solutions derived either from the aforementioned concrete solving or the aforementioned symbolic solving) it is marked for visiting at a later stage in the algorithm. If it is associated to an 'unsolved' solution, the last node is not marked.

As example of the preceding algorithm, the following table shows a number of paths and corresponding solutions:

| Path | Solution |
| --- | --- |
| i, vii, vi, x | 0 |
| i, vii, viii, x | 0 |
| i, vii, vi, x | 0 |
| i, vii, viii, x | 0 |
| v, viii, x | 1 |

Figure 11:
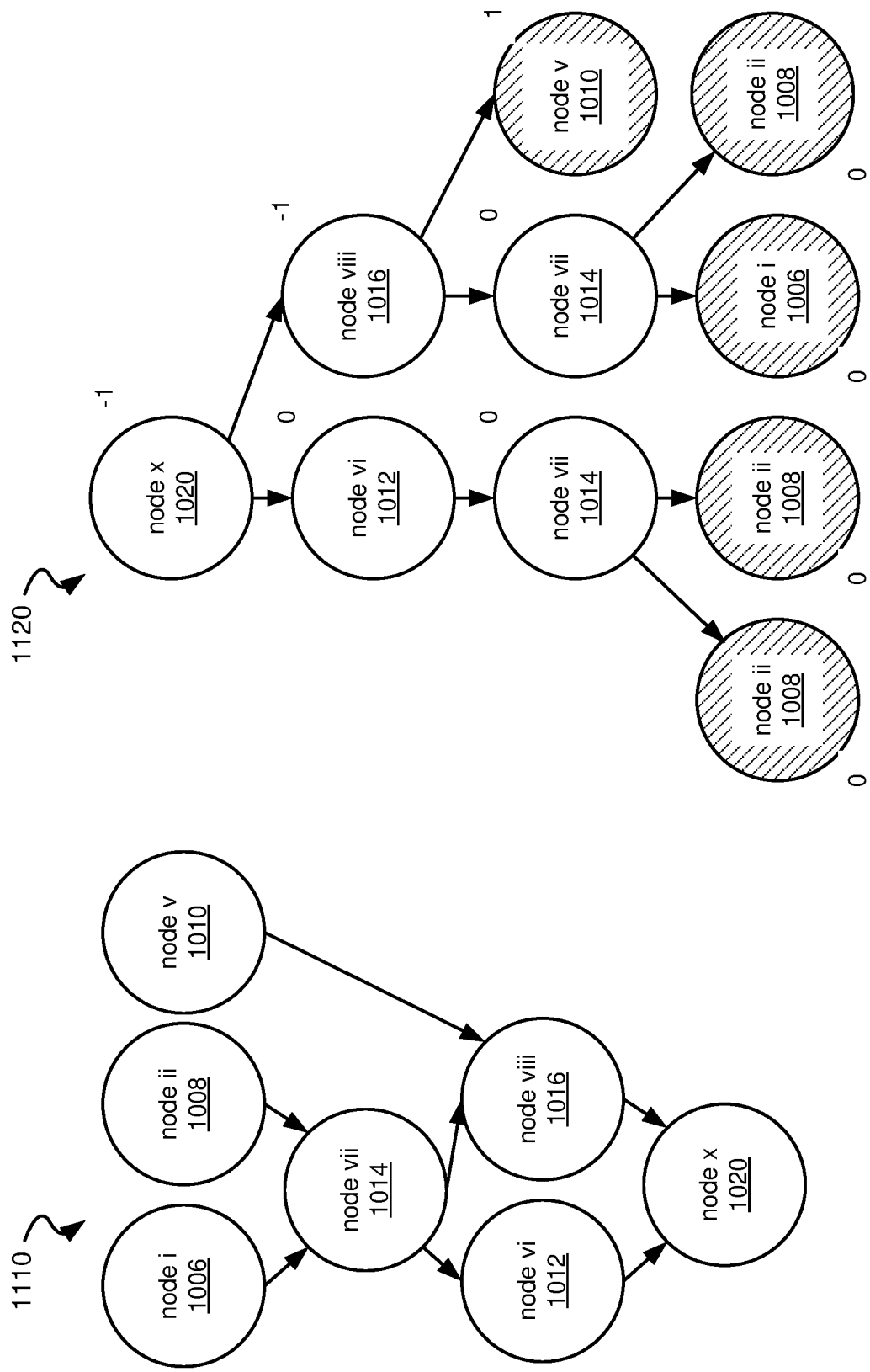
FIG. 11 shows an example flow control flow graph and corresponding solution reduction tree manipulated in accordance with some embodiments.

For the purpose of explaining the preceding algorithm, a simplification is made that all solutions with the same value are compatible (i.e., solution 0 is compatible only with Solution 0 and not Solution 1). It is noted that in application the semantics of solution compatibility is slightly more complex. A flow control flow graph 1110 and a corresponding solution reduction tree 1120 is shown in FIG. 11 that correspond to the paths and solutions set forth in the table above. In solution reduction tree 1120:

(1) Nodes indicated with a '−1' are considered to not be associated to any solution.
(2) Nodes that are filled with the lined pattern are marked to be visited at a later stage in the algorithm.
(3) It is observed that nodes from flow control graph 1110 may appear multiple times in solution reduction tree 1120.

Referring again to FIG. 6C, paths from the solution reduction tree (e.g., solution reduction tree 1120 of FIG. 11) are extracted to yield a reduced solution reduction tree (block 674). Extracting the paths from the solution reduction tree involves visiting each marked node in the solution reduction tree and performing the following path extraction algorithm on each marked node:

A. Iteratively traverse to the immediate predecessor node until either one of the following two conditions are true:
  1. There is no immediate predecessor node to the current node; or
  2. The immediate predecessor node is not associated to any solution (i.e., the immediate predecessor node is indicated as a "−1" similar to that discussed above in relation to FIG. 11).
B. Check if the last node visited in Step A is marked as 'traversed' and:
  1. If the last node is marked as "traversed", processing of the marked node is terminated and processing of the next marked node begins at Step A; or
  2. If the last node is not marked as "traversed", the last node is marked and processing proceeds to Step C.

C. Starting from the last node visited in Step A, iteratively traverse to the immediate predecessor node, for each node visited in the traversal append the associated control flow graph node to a list. This is repeated until there are no more predecessor nodes to traverse.

D. Once iteration in Step C is complete, the aforementioned list will contain a reduced/simplified path through the control flow graph. This path is associated with the solution associated to the marked node where the traversal began.

The following table of paths and corresponding solutions for a produced solution reduction tree can be used to illustrate application of the preceding path extraction algorithm:

| Path | Solution |
| --- | --- |
| i, vii, vi, x | 0 |
| i, vii, viii, x | 0 |
| i, vii, vi, x | 0 |
| i, vii, viii, x | 0 |
| v, viii, x | 1 |

Applying the preceding path extraction algorithm to the example produced solution reduction tree, the following reduced solution reduction tree:

| Path | Solution |
| --- | --- |
| vi, x | 0 |
| vii, viii, x | 0 |
| v, viii, x | 0 |

The following pseudocode represents the preceding path extraction algorithm:

```
G = nx.DiGraph( )
node_annotation = dict( )
tail_lookup = dict( )
global_edge_map = dict( )
node_lookup = dict( )
tails = [ ]
last_node_name = 0
reduced = [ ]
for s in solutions:
   last = None
   last_edge_map = None
   for n in reversed(s.path):
      origin = None
      if last_edge_map is None:
         if n in tail_lookup:
            origin = tail_lookup[n]
            last_edge_map = global_edge_map [origin]
         else:
            last_edge_map = dict( )
            origin = last_node_name
            last_node_name += 1
            G.add_node(origin)
            global_edge_map[origin] = last_edge_map
            tail_lookup[n] = origin
      elif n not in last_edge_map:
         origin = last_node_name
         last_node_name += 1
         last_edge_map[n] = origin
         last_edge_map = dict( )
         global_edge_map[origin] = last_edge_map
      else:
         origin = last_edge_map[n]
         last_edge_map = global_edge_map[origin]
      if origin not in node_annotation:
         node_annotation [origin] = s.num
      elif node_annotation[origin] == −1 or node_annotation[origin]
!= s.num:
```

-continued

```
        node_annotation [origin] = −1
        if last is not None:
            G.add_edge(last, origin)
        node_lookup[origin] = n
        last = origin
        if last in node_annotation and node_annotation[last] >= 0:
            tails.append(last)
    visited_tails = set( )
    for t in tails:
        test = t
        base_node = None
        while True:
            base_node = test
            pred = list(G.predecessors(test))
            if len(pred) == 0:
                break
            test = pred[0]
            if node_annotation[test] == −1:
                break
        if base_node in visited_tails:
            continue
        visited_tails.add(base_node)
        new_path = [ ]
        while True:
            new_path.append(node_lookup[base_node])
            pred = list(G.predecessors(base_node))
            if len(pred) == 0:
                break
            base_node = pred[0]
        reduced.append(new_path)
    return reduced
```

Solutions are actualized from the reduced solution reduction tree to yield actualized solutions (block 676). Such actualization includes rewriting the solutions from the reduced solution reduction tree to rewrite the original graphical intermediate representation such that the selected dispatcher node is eliminated while maintaining behavioral equivalence. This actualization begins by assuring that the solved paths (i.e., work items) do not overlap. To illustrate this process, reference is made to FIG. 5 where for simplicity operation A 506 is referred to simply as A, operation B 508 is referred to simply as B, operation C 510 is referred to simply as C, and operation D 512 is referred to simply as D. Assume that the solutions to two different work items are as follows:

| Work Item: Path | Solution |
| --- | --- |
| Work Item 1: A, D, C, Dispatcher 504 | B |
| Work Item 2: B, D, C, Dispatcher 504 | C |

Figure 12:
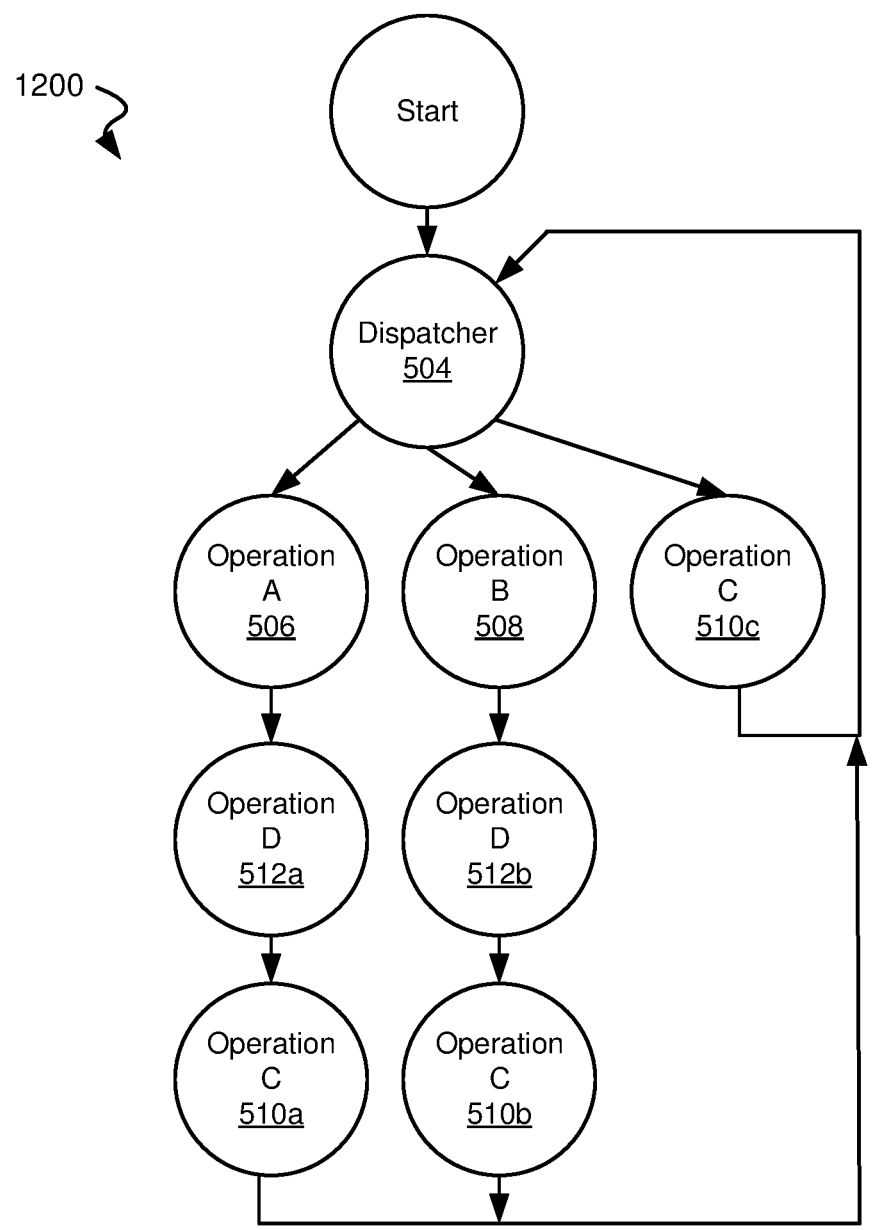
FIG. 12 is the example graphical intermediate representation of FIG. 5 modified to a control flow graph having superblocks in accordance with some embodiments.

The solution discovered with work item 1 can be reflected by rewriting node C to branch to node B instead of dispatcher node 504. This effectively eliminates dispatcher node 504. The problem with such a solution is that it would then contradict the solution found in work item 2. Graphical intermediate representation 500 cannot be easily rewritten to satisfy the identified solutions because the work items (i.e., work item 1 and work item 2) have overlapping paths.

Where an overlap is identified between work items, each path is rewritten such that the nodes along the path model a superblock. Superblocks are well known in the art and defined in Russell, T., Malik, A. M., Chase, M., & van Beek, P. (2009), "Learning Heuristics for the Superblock Instruction Scheduling Problem", *IEEE Transactions on Knowledge and Data Engineering*, 21(10), 1489-1502. The aforementioned reference is incorporated herein by reference for all purposes. Such a process of rewriting the nodes along the path to model a superblock may be demonstrated with reference again to FIG. 5. In particular, the control flow graph of FIG. 5 is refactored such that nodes A, D, and C (work item 1) are formed into a first superblock and nodes B, D, and C (work item 2) are formed into a second superblock. To do so, some nodes in the work items are duplicated. The resulting control flow graph 1200 including the superblocks is shown in FIG. 12. As shown, to make the superblock A, D, C and the superblock B, D, C, node D 512 is replicated (node D 512*a* and node D 512*b*), and node C 510 is replicated (node C 510*a*, node C 510*b*, and node C 510C). After the refactoring to make the superblocks, rewriting the control flow graph to remove dispatcher 504 and maintain behavioral action is simple.

Figure 13:
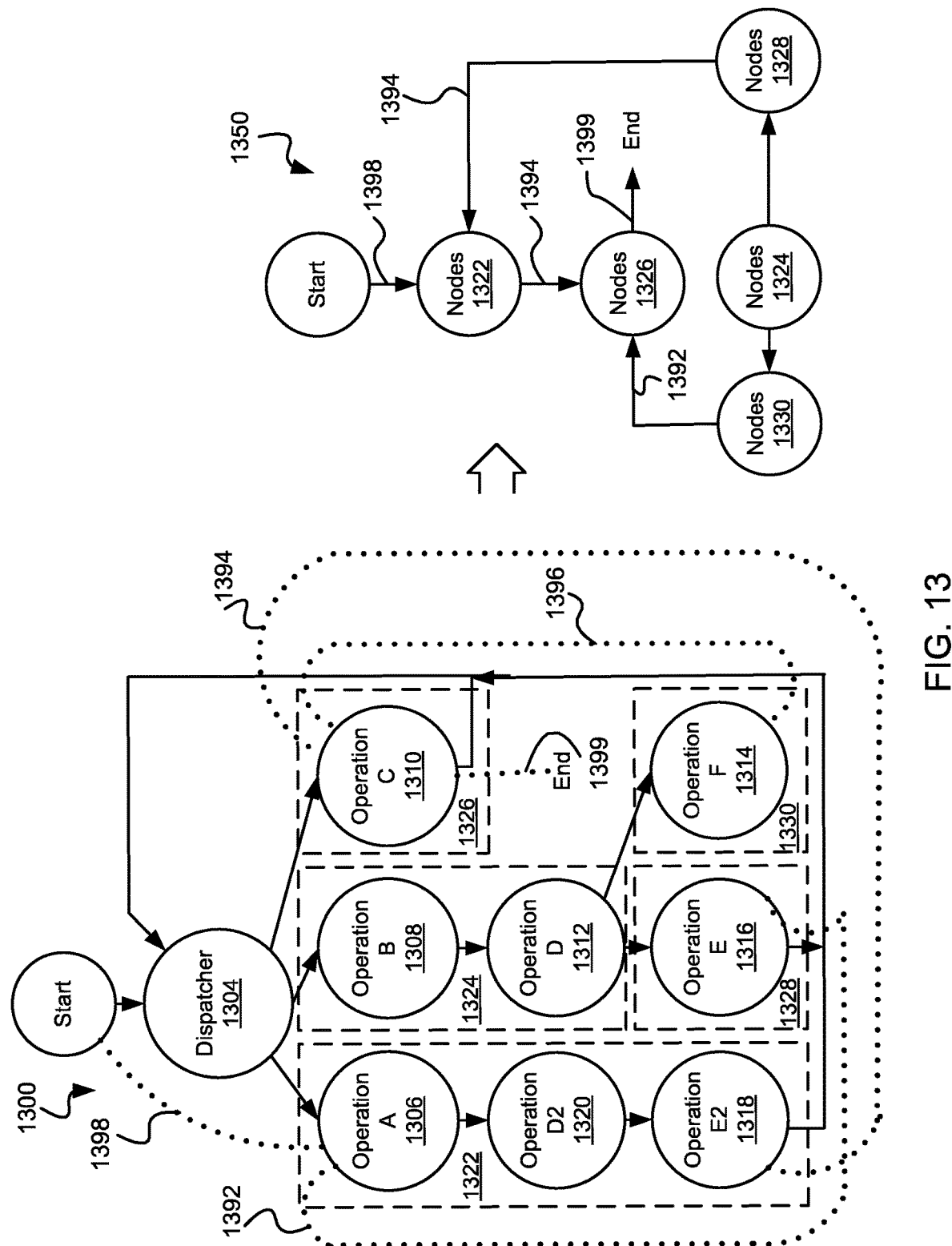
FIG. 13 shows an example flow control graph and a corresponding state machine that is produced in accordance with various embodiments.

With the work item overlaps resolved in the control flow graph, the control flow graph is encoded to produce a state machine. Referring to FIG. 13, shows an example flow control graph 1300 and a corresponding state machine 1350 that is produced in accordance with various embodiments. As shown, dispatcher 1304 is replaced by a number of state transfer edges 1392, 1394, 1396, 1398 in state machine 1350. In particular, state transfer edge 1392 represents a state transfer from an operation E 1316 (included in a node set 1328) to an operation A 1306 (included in a node set 1322); state transfer edge 1394 represents a state transfer from an operation E2 1318 (included in node set 1322) to an operation C 1310 (included in a node set 1326); state transfer edge 1396 represents a state transfer from an operation F 1314 (included in a node set 1330) to an operation C 1310 (included in a node set 1326); and state transfer edge 13968 represents a state transfer from the start to operation A 1306. Node set 1322 further includes an operation D2 between operation A 1306 and operation E2 1318; and node set 1324 further includes an operation B 1308 and an operation D 1312 which precede operation E 1316.

Each of the edges of the state machine is encoded to represent either one of the below:
  (A) Dispatcher Mediated State Transition: This is an edge that represents a state transition that is orchestrated by the dispatcher node. These appear visually as edges represented with dotted lines in the Abstract State Machine presented in FIG. 1300 and is associated to a work-item solution.
  (B) Simple State Transition: These are state transitions that occur explicitly by the encoded control flow of the graphical intermediate representation. For example, the edge between operation D 1312 and operation E 1316 in control flow graph 1300 is mapped to a simple state transfer in the produced state machine 1350. These edges are insignificant and are ignored when we begin rewriting code.

An SSA graphical intermediate representation is reconstructed from the state machine (block 678). Such reconstruction is done in accordance with the following pseudo-code.

```
def rewrite_state_transitions(analysis, dispatcher, state_machine):
    solvedAny = false
    solveQueue = Queue(state_machine.solved_edges)
    while(solveQueue is not empty):
        if solveQueue not empty:
            r = rewrite_edge(solveQueue.dequeue( ))
            solved_any |= r
    if solved_any
        cleanup_code( )
    return solved_any
```

The solve_queue is updated to include all of the state machine edges that replaced the dispatcher node. Edges are iteratively rewritten in the solve_queue. Where an item is in the solve_queue, it can be solved fairly trivially using a rewrite algorithm. The rewrite algorithm will rewrite the underlying control-flow of the modeled state transition such that instead of using the dispatcher node, it uses a newly constructed duplicate of the dispatcher node that has been mutated to respect the branching behavior of the respective state machine edges that replaced the dispatcher node.

Returning to FIG. 6B, once the SSA graphical intermediate representation is complete (block 610), the processes of blocks 604-614 are repeated for the updated SSA graphical intermediate representation. This continues until no control flow flattening problems are identified (block 606). Once no control flow flattening problems are identified (block 606), the re-written graphical intermediate representation is returned in SSA form (block 612). This may be returned to a calling application (e.g., FIG. 4B, element 454).

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for preparing code for malicious behavior analysis, the method comprising:
   generating, by a processing resource, a graphical intermediate representation of an executable code; and
   applying, by the processing resource, a code deobfuscation process to the graphical intermediate representation to yield a modified graphical intermediate representation for eliminating a dispatcher node, wherein applying the code deobfuscation process comprises:
      identifying, by the processing resource, the dispatcher node in the graphical intermediate representation;
      identifying, by the processing resource, at least one work item, wherein the at least one work item is a path through the dispatcher node and includes at least one operation node in addition to the dispatcher node; and
      proving, by the processing resource, a branch behavior of the dispatcher node, wherein proving the branch behavior includes applying at least one algorithm to the work item to yield at least one solution path, wherein the at least one solution path is included in a solution set, wherein further
         the at least one operation node is a first operation node, wherein the path through the dispatcher node is a first path through the dispatcher node, wherein the at least one algorithm is a direct algorithm, and wherein proving the branch behavior of the dispatcher node further comprises:
            determining, by the processing resource, that application of the direct algorithm to the work item fails to yield any solution path;
            identifying, by the processing resource, a second path through the dispatcher node that includes a second operation node in addition to the first operation node; and
            applying, by the processing resource, the direct algorithm to the second path through the dispatcher node to yield the at least one solution path.

2. The method of claim 1, wherein the applying the code deobfuscation process to the graphical intermediate representation yields an unpacking variable, the method further comprising:
   identifying, by the processing resource, an unpacking variable in the executable code; and
   using, by the processing resource, the unpacking variable to unpack the executable code to yield a corresponding unpacked data set.

3. The method of claim 2, the method further comprising:
   performing, by the processing resource, malicious code detection on the unpacked data set.

4. The method of claim 1, wherein the path through the dispatcher node
   ends at the dispatcher node and
   includes only one instance of any given operation node.

5. The method of claim 1, applying the code deobfuscation process further comprises:
   reducing, by the processing resource, the solution set to yield a solution reduction tree;
   extracting, by the processing resource, paths from the solution reduction tree to yield a solution;
   actualizing, by the processing resource, the solution to yield an actualized solution corresponding to the branch of the graphical intermediate representation; and
   wherein the modified graphical intermediate representation includes the actualized solution.

6. The method of claim 5, wherein the second path through the dispatcher node
   ends at the dispatcher node and includes only one instance of any given operation node.

7. The method of claim 6, wherein the second path through the dispatcher node meets the following criteria: where there is a single predecessor operation node to the first node of the first path, the single predecessor operation node is prepended to the first operation node.

8. A system for preparing code for malicious behavior analysis, the system comprising:
   a processing resource;
   a non-transitory computer-readable medium, coupled to the processing resource, having stored therein instructions that when executed by the processing resource cause the processing resource to:
      generate a graphical intermediate representation of an executable code; and
      apply a code deobfuscation process to the graphical intermediate representation to yield a modified graphical intermediate representation for eliminating, a dispatcher node, wherein applying the code deobfuscation process comprises:
         identifying, by the processing resource, the dispatcher node in the graphical intermediate representation;
         identifying, by the processing resource, at least one work item, wherein the at least one work item is a path through the dispatcher node and includes at least one operation node in addition to the dispatcher node; and
         proving, by the processing resource, a branch behavior of the dispatcher node, wherein proving the branch behavior includes applying at least one algorithm to the work item to yield at least one solution path, wherein the at least one solution path is included in a solution set, wherein further the at least one operation node is a first operation node, wherein the path through the dispatcher node is a first path through the dispatcher node, wherein the at least one algorithm is a direct algorithm, and wherein proving the branch behavior of the dispatcher node further comprises:

determining, by the processing resource, that application of the direct algorithm to the work item fails to yield any solution path;

identifying, by the processing resource, a second path through the dispatcher node that includes a second operation node in addition to the first operation node; and applying, by the processing resource, the direct algorithm to the second path through the dispatcher node to yield the at least one solution path.

9. The system of claim 8, wherein the instructions that when executed by the processing resource to cause the processing resource to apply the code deobfuscation process include instructions executable by the processing resource to:

identify an unpacking variable in the executable code; and use the unpacking variable to unpack the executable code to yield a corresponding unpacked data set.

10. The system of claim 9, wherein the instructions that when executed by the processing resource to cause the processing resource to apply the code deobfuscation process include instructions executable by the processing resource to:

perform malicious code detection on the unpacked data set.

11. The system of claim 8, wherein the path through the dispatcher node ends at the dispatcher node and includes only one instance of any given operation node.

12. A non-transitory computer-readable storage medium embodying a set of instructions, which when executed by a processing resource of a computer system, causes the one or more processing resources to:

generate a graphical intermediate representation of an executable code; and apply a code deobfuscation process to the graphical intermediate representation to yield a modified graphical intermediate representation for eliminating a dispatcher node, wherein applying the code deobfuscation process comprises:

identifying, by the processing resource, the dispatcher node in the graphical intermediate representation;

identifying, by the processing resource, at least one work item, wherein the at least one work item is a path through the dispatcher node and includes at least one operation node in addition to the dispatcher node; and proving, by the processing resource, a branch behavior of the dispatcher node, wherein proving the branch behavior includes applying at least one algorithm to the work item to yield at least one solution path, wherein the at least one solution path is included in a solution set, wherein further the at least one operation node is a first operation node, wherein the path through the dispatcher node is a first path through the dispatcher node, wherein the at least one algorithm is a direct algorithm, and wherein proving the branch behavior of the dispatcher node further comprises:

determining, by the processing resource, that application of the direct algorithm to the work item fails to yield any solution path;

identifying, by the processing resource, a second path through the dispatcher node that includes a second operation node in addition to the first operation node; and applying, by the processing resource, the direct algorithm to the second path through the dispatcher node to yield the at least one solution path.

13. The non-transitory computer-readable medium of claim 12, wherein the instructions that when executed by the processing resource to cause the processing resource to apply the code deobfuscation process include instructions executable by the processing resource to:

identify an unpacking variable in the executable code; and use the unpacking variable to unpack the executable code to yield a corresponding unpacked data set.

14. The non-transitory computer-readable medium of claim 12, wherein the path through the dispatcher node ends at the dispatcher node and includes only one instance of any given operation node.

15. The non-transitory computer-readable medium of claim 12, wherein the instructions that when executed by the processing resource to cause the processing resource to apply the code deobfuscation process include instructions executable by the processing resource to:

perform malicious code detection on the unpacked data set.

* * * * *